US009329295B1

(12) United States Patent
Blake et al.

(10) Patent No.: US 9,329,295 B1
(45) Date of Patent: May 3, 2016

(54) FERROMAGNETIC FASTENER LOCATING DEVICE

(71) Applicant: Diamond Resource, LLC, Goffstown, NH (US)

(72) Inventors: John Blake, Kennebunk, ME (US); David Lee Still, Goffstown, NH (US)

(73) Assignee: DIAMOND RESOURCE, LLC, Goffstown, NH (US)

( * ) Notice: Subject to any disclaimer, the term of this patent is extended or adjusted under 35 U.S.C. 154(b) by 707 days.

(21) Appl. No.: 13/736,102

(22) Filed: Jan. 8, 2013

(51) Int. Cl.
*G01R 33/02* (2006.01)
*G01R 19/00* (2006.01)
*G01V 3/08* (2006.01)

(52) U.S. Cl.
CPC ........................................ *G01V 3/08* (2013.01)

(58) Field of Classification Search
CPC ..... G01N 27/72; G01N 27/82; G01N 33/241; G01N 15/14; G01N 1/00; G01V 3/15; G01V 3/088; G01V 3/08; G01V 3/081; G01V 3/104; G01V 15/00; G01V 3/10; G01V 3/12; G01V 3/38; G01V 3/107; G01V 13/00; G01V 3/00; G01V 3/02; G01V 3/083; G01V 3/28; G01V 9/00
USPC ............ 324/207.16, 345, 381, 463, 205, 210, 324/213, 219, 228, 232, 257, 259, 262, 324/754.17, 754.29, 174, 67
See application file for complete search history.

(56) References Cited

U.S. PATENT DOCUMENTS

| 3,541,438 | A | * | 11/1970 | Wadley | G01V 3/08 |
| | | | | | 324/228 |
| 4,310,797 | A | * | 1/1982 | Butler | G01V 3/08 |
| | | | | | 324/228 |
| 4,896,131 | A | | 1/1990 | Podlesny et al. | |
| 5,296,806 | A | * | 3/1994 | Hurl, Jr. | G01V 3/08 |
| | | | | | 324/214 |
| 6,229,294 | B1 | * | 5/2001 | Wun | G01V 3/15 |
| | | | | | 324/228 |
| 7,690,124 | B1 | * | 4/2010 | Henry | G01C 15/004 |
| | | | | | 324/67 |
| 2003/0066672 | A1 | * | 4/2003 | Watchko | C23C 4/00 |
| | | | | | 174/50 |

FOREIGN PATENT DOCUMENTS

TW   EP 0416162 A1 * 3/1991 ............... G01V 3/08

* cited by examiner

*Primary Examiner* — Patrick Assouad
*Assistant Examiner* — Taqi Nasir
(74) *Attorney, Agent, or Firm* — Mesmer & Deleault PLLC

(57) ABSTRACT

A device for locating a ferromagnetic object has a non-magnetic housing with a front end, a rear end, and a perimeter wall defining a chamber within the housing. A ferromagnetic member is housed within the chamber in a substantially fixed position. A magnet element is housed within the chamber between the front end and the ferromagnetic member, wherein the magnet element is reversibly movable between a first position in which the magnet element is proximate the ferromagnetic member, and a second position in which the magnet element is proximate the front end.

13 Claims, 20 Drawing Sheets

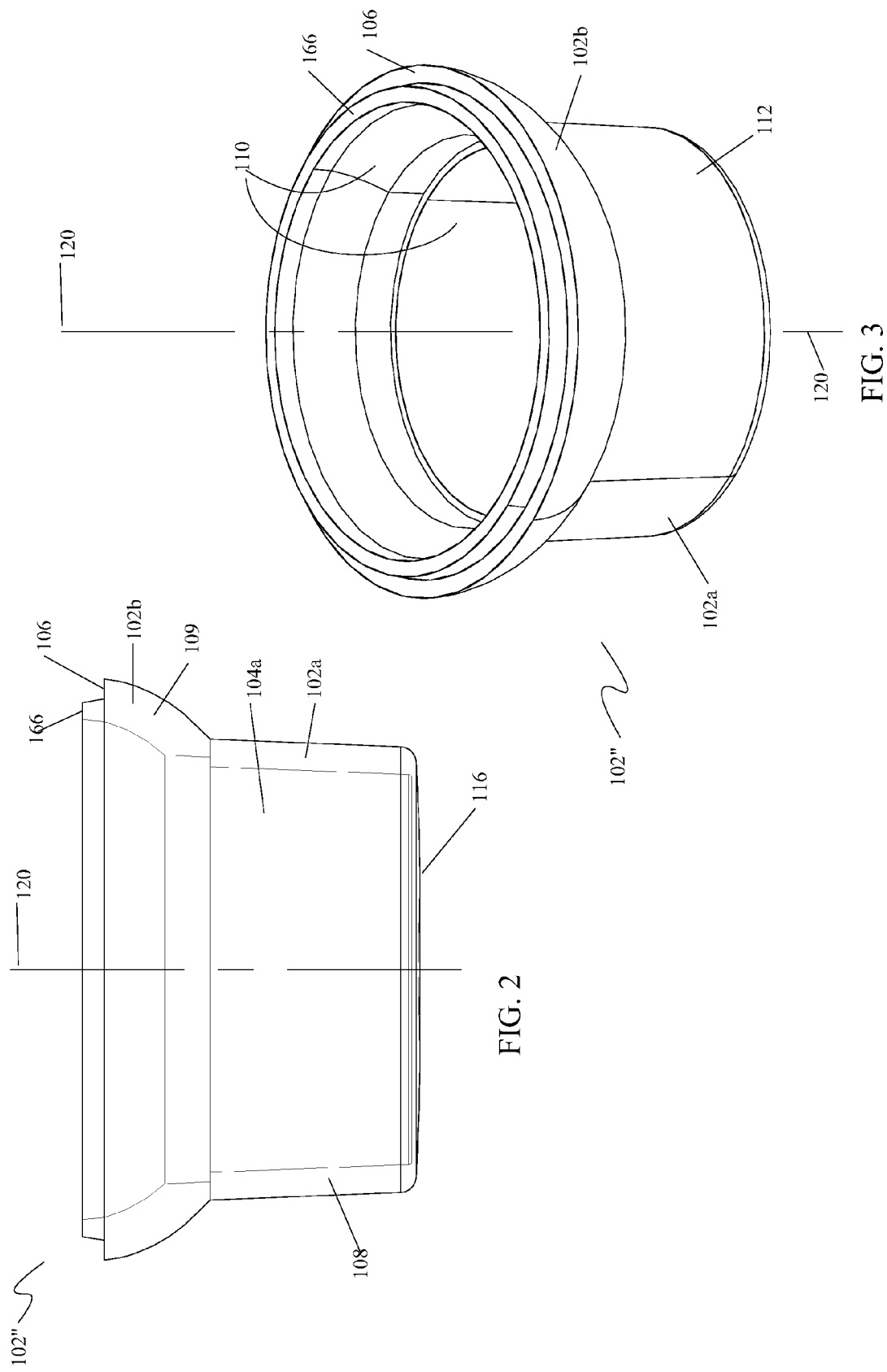

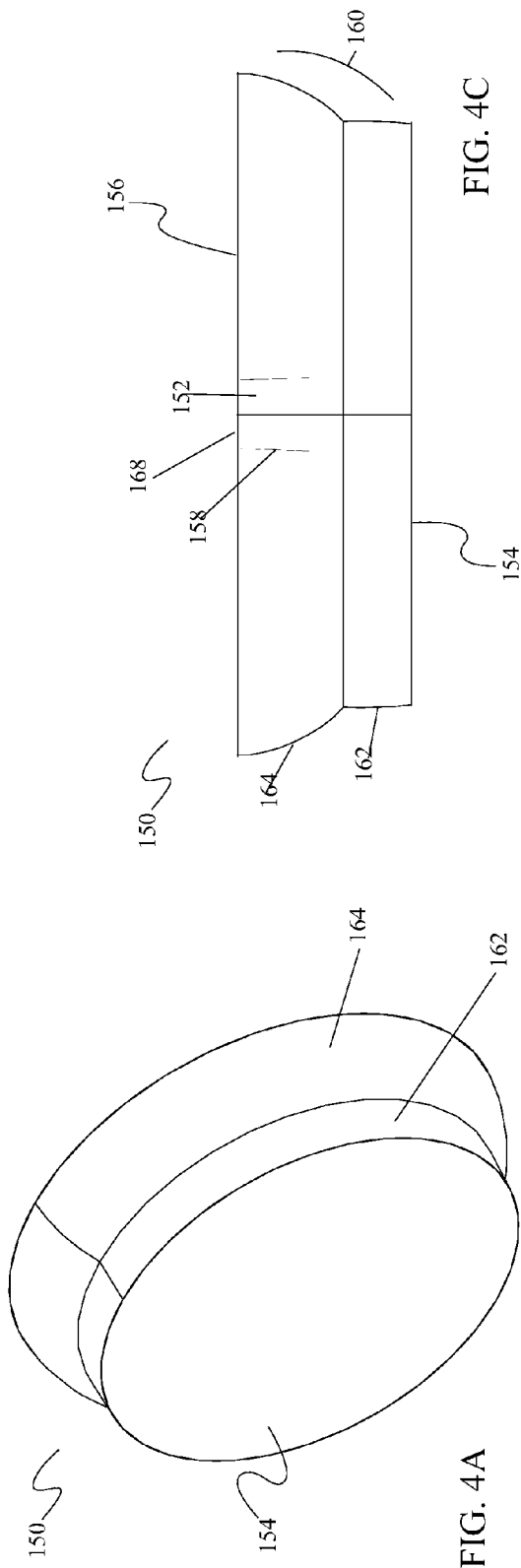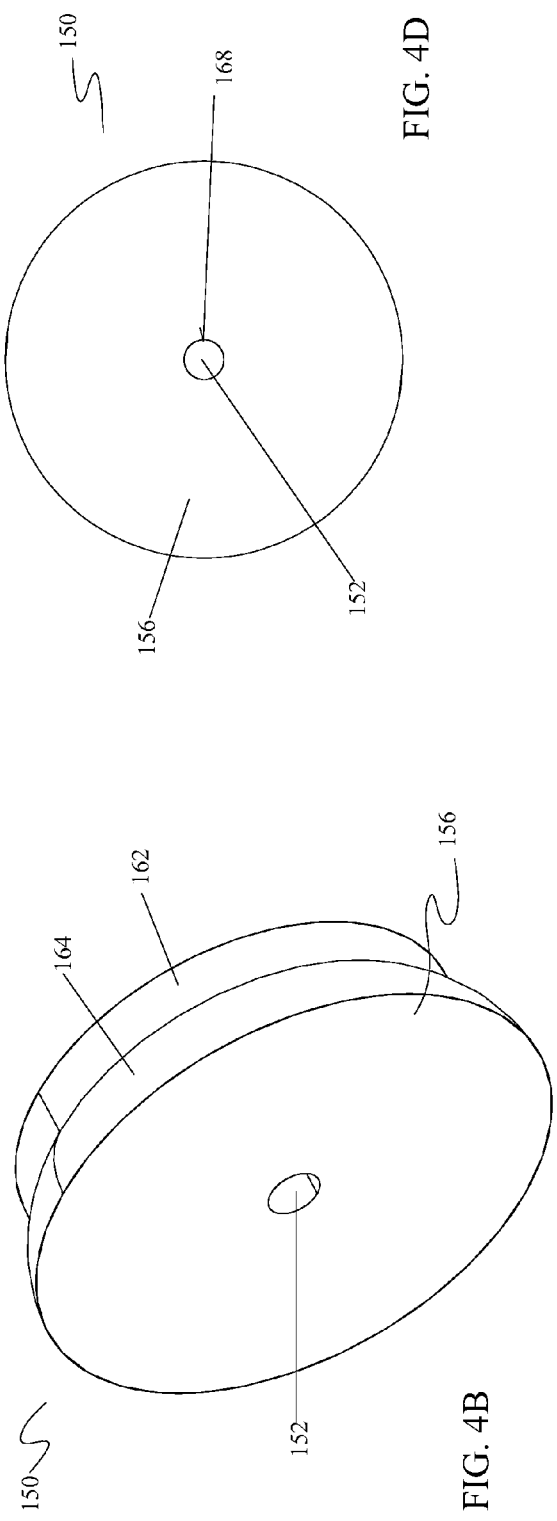

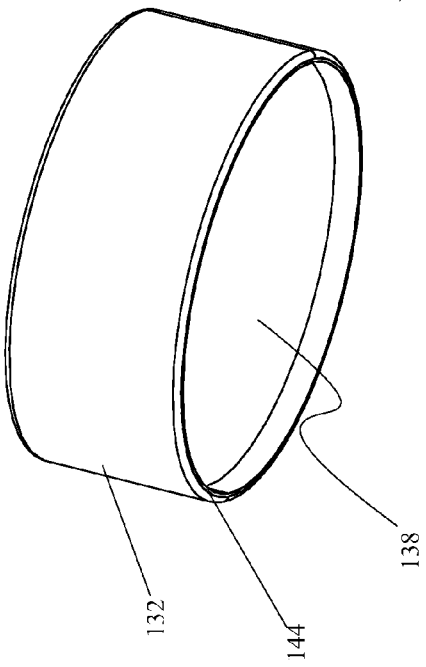
FIG. 6A
FIG. 6B
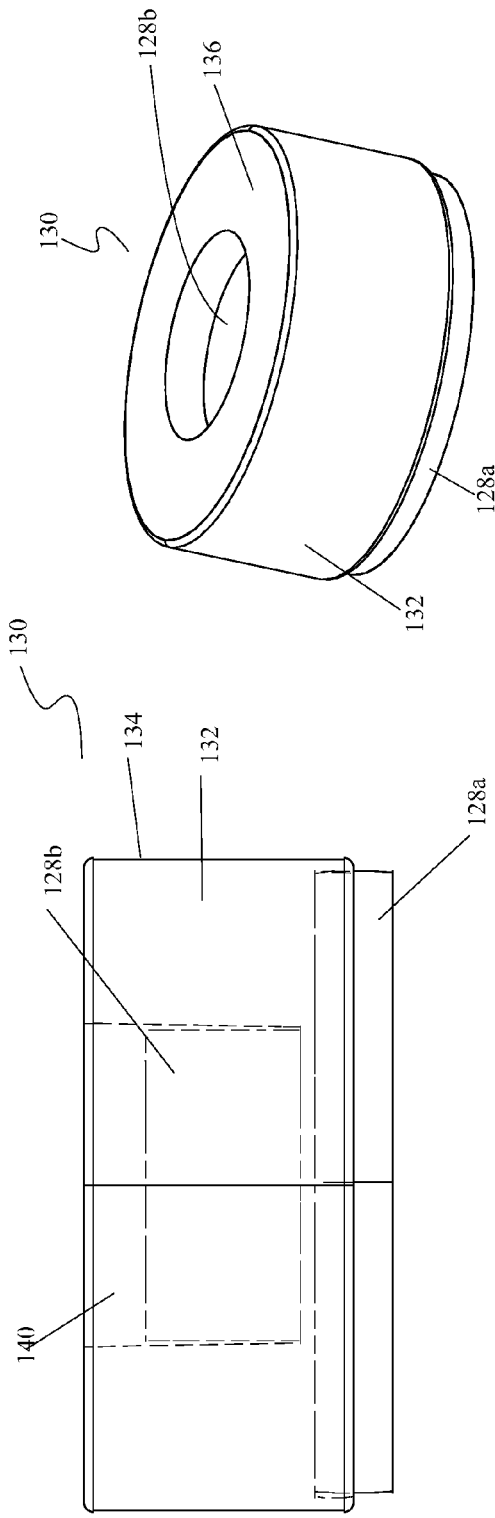
FIG. 5

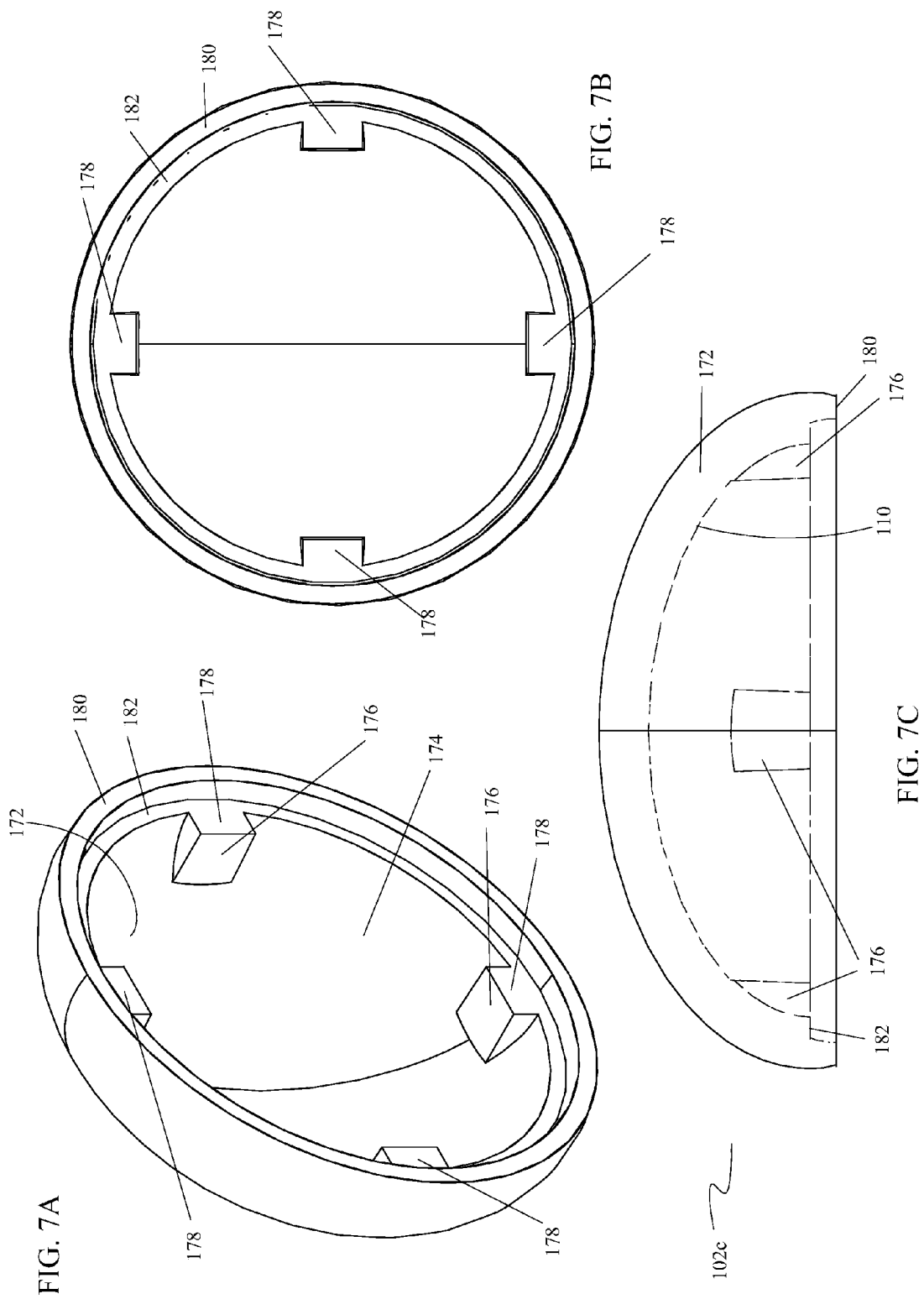

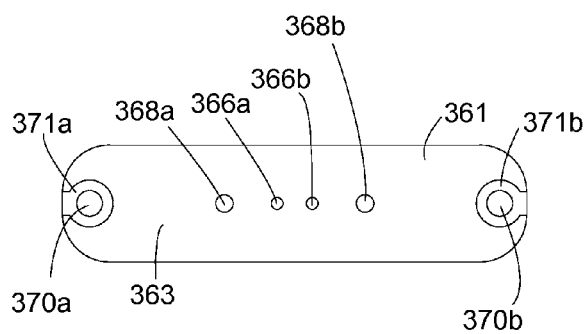
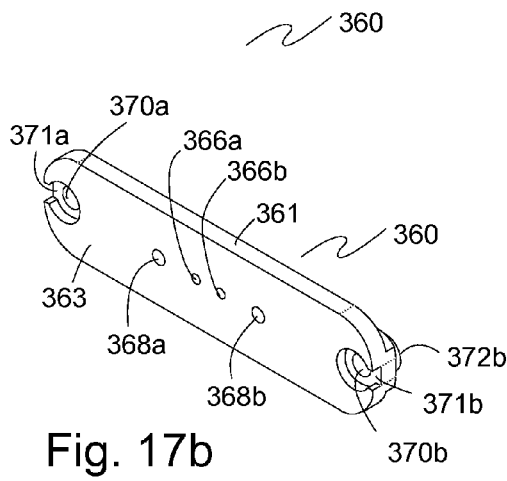
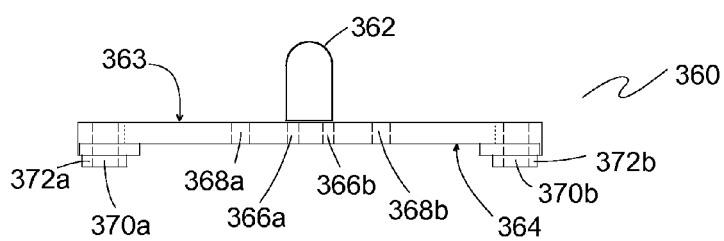
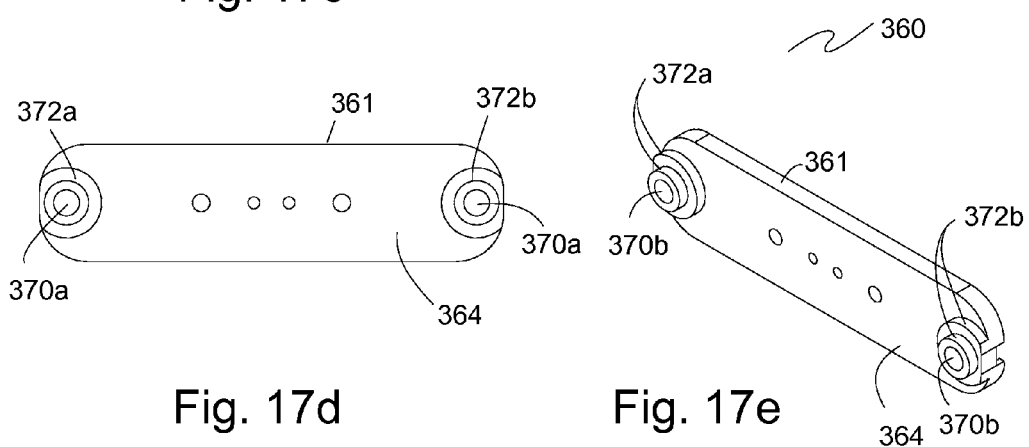
Fig. 17a
Fig. 17b
Fig. 17c
Fig. 17d
Fig. 17e

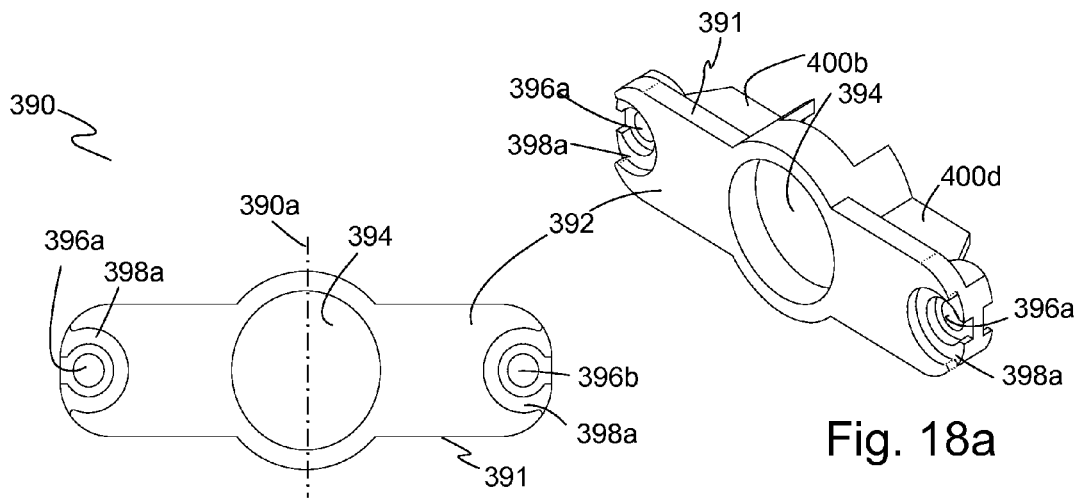
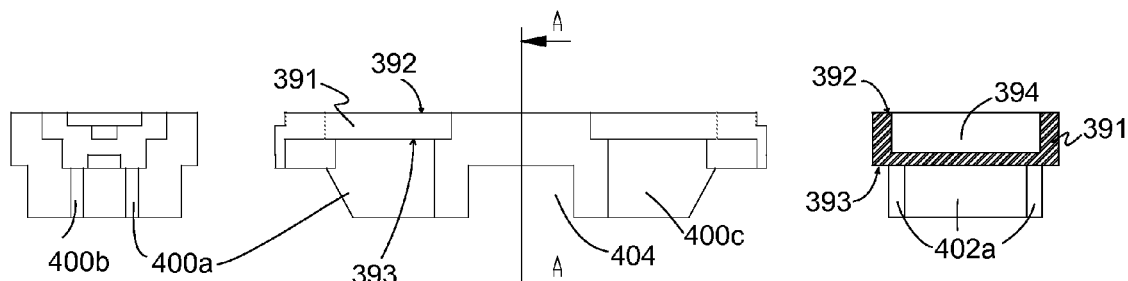
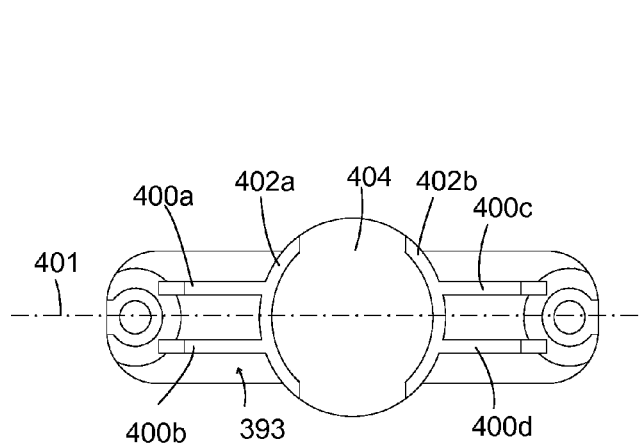
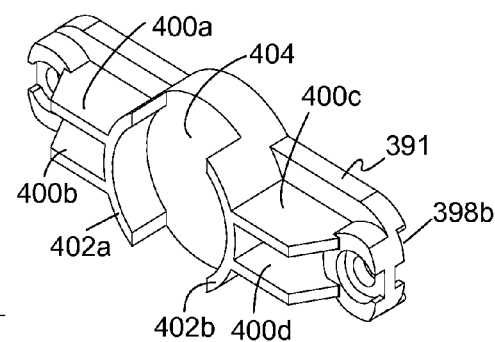

FERROMAGNETIC FASTENER LOCATING DEVICE

This application is a continuation-in-part of U.S. patent application Ser. No. 11/530,681, filed on Dec. 2, 2011, which claims the benefit of U.S. Provisional Patent Application No. 61/419,286, filed Dec. 3, 2010.

BACKGROUND OF THE INVENTION

1. Field of the Invention

The present invention relates generally to hand tools. More specifically, the present invention relates to a device for locating ferromagnetic objects.

2. Description of the Prior Art

It is often necessary to locate structural support members that are hidden behind a wall, ceiling, or floor covering material. These support members include wall studs, floor joists, beams, roof rafters, and strapping. The support members may be wood, as are commonly used in residential construction, or metal, as are commonly used in commercial construction.

Wall or ceiling coverings are secured to structural support members using ferromagnetic fasteners such as screws or nails that are driven through the covering and into the supporting members underneath. For example, drywall sheets are secured with fasteners to framing members as part of a wall or ceiling. These fasteners are concealed with wall compound to finish the surface, thereby concealing the location of the underlying support members.

It is also often necessary to find ferromagnetic fasteners in stand-alone pieces of wood or other non-magnetic substances. For example, prior to using a planer, saw, or other machine on a loose piece of (used) wood, it is desirable to locate ferromagnetic fasteners in the wood to prevent metallic fasteners from causing damage to the machine.

A ferromagnetic material is a material having magnetic properties similar to those of iron. Simply put, one can make a magnet out of a ferromagnetic material. Ferromagnetic materials include iron, nickel, cobalt, and alnico (an aluminum-nickel-cobalt alloy).

During construction, the locations of structural supports are known to the installer in order to properly secure the covering with fasteners. The fasteners are then concealed during the finishing process. It is often necessary to know the location of structural members in order to perform repair work or to securely hang heavy items. One can discover the location of structural members by locating the member itself, or by locating the fasteners attached to structural members.

Locating devices or "stud finders" have been used to locate the presence of structural members within walls and ceilings. Active electronic devices and passive magnetic devices are types of devices used to find structural members in building construction. Active electronic devices use waves that permeate a wall, ceiling, or floor covering. By detecting a change in density when the user moves it from a low density section of wall (no support structure) to a higher density area (possible support structure), these electronic devices indicate the location of a structural member. For active electronic devices to function properly, however, the user must calibrate the device on an area of the wall that does not have support structures (e.g., studs). In other words, the user must calibrate the device over a low density area of the wall.

Passive magnetic devices are relatively accurate since they depend on the fact that most coverings are secured in place by means of metal fasteners that are driven into support members through a wall, floor, or ceiling covering. Since the location of these fasteners is the same as the location of the support structures, magnetic stud finders are used to reveal their location. For example, one device has a housing with pivot bosses to pivotably support a magnet assembly in a location where it can be influenced by the nearby presence of magnetic metals such as steel nails. When the device is out of the magnetic influence of a steel nail, the magnet assembly is rotated to a random angle that remains substantially constant while the user moves the stud finder. When the user moves the stud finder into close proximity to a steel nail, the magnet assembly rotates about the pivot boss until its longitudinal axis points towards the steel nail. The location of the steel nail is verified by moving the stud finder past the steel nail and noting that the magnet assembly rotates to maintain its axis to point towards the steel nail.

SUMMARY OF THE INVENTION

A problem with electronic locating devices is the inherent unreliability caused by variables such as the location where the device is calibrated. This is so because the user generally has no way to know the correct location on the wall to calibrate the device since the user does not know the location of structural members within the wall. Even if the device is somehow calibrated at an ideal low-density location on the wall, the device still may give the user a false indication if it detects an increase in wall density that is due to something other than a support member. Erroneous results may occur if the device detects something such as a pipe, insulation, or simply a change in density of the wall covering itself.

One problem with some magnetic stud sensors is that the method of indication may falsely indicate the location of a stud. Magnetic sensors require very close visual inspection of the indicator because the device can falsely "indicate" if the device is jostled when passed over a bump in the wall surface. For example, consider a device having an indicator that is capable of moving both in response to magnetic attraction to a fastener and in response to gravity or movement. If such a device is used on a textured wall, the indicator may move out of its resting position as a result of vibration as the device passes over the textured surface.

Therefore, what is needed is a device for locating ferromagnetic objects that eliminates the need to calibrate the device for wall density before each use and a device that more reliably indicates the location of a ferromagnetic object.

Another object of the present invention is to provide a device capable of locating ferromagnetic materials located within a wall, ceiling, floor, or other concealed location.

Another object of the present invention is to provide a device for locating ferromagnetic materials that eliminates the need to calibrate the device.

The present invention achieves these and other objectives by providing a device for detecting ferromagnetic objects by movement of a magnet from a resting or first position to an active or second position in response to the ferromagnetic object.

The present invention achieves these and other objectives by providing a device for detecting ferromagnetic objects by movement of a magnet from a resting or first position to an active or second position in response to the ferromagnetic object. In one embodiment of the present invention, a device has a non-magnetic housing with a perimeter wall, a front surface, and a rear surface. The perimeter wall of the housing defines a chamber within the housing. The device has a stop element located in the chamber between the front surface and the rear surface. A magnet element is housed within the chamber and is movable between a resting or first position, where the magnet element is proximate the stop element, and an active or second position, where the magnet element is proximate the front surface. The device also includes a mechanism for returning the magnet element to the resting or first position in the absence of a ferromagnetic object located external to but proximate the front surface.

The mechanism for returning the magnet element to the resting position may be magnetic attractive force, elastic force, and/or pneumatic force. In the case of magnetic attractive force, the magnetic attractive force may result from the presence of a ferromagnetic member positioned behind the stop element or closer to the rear surface to attract the magnet element to the resting position. To signal detection of an object, the magnetic attraction of the magnet element to a ferromagnetic fastener or other object is greater than the attraction to the ferromagnetic member in the device. Thus, when the device is moved away from the ferromagnetic fastener, for example, the magnet member is attracted to the ferromagnetic member in the device. In one embodiment, the ferromagnetic member is a steel solid, a plurality of ferromagnetic particles, a magnet, or a combination of various ferromagnetic objects.

In the case of elastic force, the elastic force may result from a spring or elastic material connected between the magnet element and the rear surface. In the case of pneumatic force, the pneumatic force may result from a pressure differential between the chamber and ambient where the pressure differential results from movement of the magnet element towards the active position.

In another embodiment, the magnet element is a magnet assembly that has a magnet holder configured to fit within the chamber. The magnet assembly has a front portion, a rear portion, and one or more magnets attached to the magnet holder. The magnet holder may have one or more recesses on the front and/or rear portion to receive part or all of the magnet(s). The magnet may set partially within and be attached to the front recess of the magnet holder. In another embodiment, the device further includes a second magnet that may be enclosed within the recess in the rear portion of the magnet holder.

In another embodiment, the device includes a disk element, which also functions as the stop element, housed within the chamber. The disk element has a forward surface and a rearward surface with the forward surface being the stop element. The disk element is configured to accept at least a portion of the ferromagnetic member. The stop element in this embodiment is the forward surface.

In another embodiment, the stop element is one or more surfaces extending within the chamber transverse to a longitudinal central axis of the housing.

In another embodiment, the device has a marking material affixed to the magnet assembly. The marking material may be chalk, graphite, lead, ink, and the like. The front surface of the device has an opening through which the marking material may pass when the magnet is in the active position.

In another embodiment, the device housing may be made of acrylic, polyvinyl chloride (PVC), nylon, polycarbonate, or acrylonitrile butadiene styrene (ABS) plastic.

In yet another embodiment, the chamber containing the magnet element may be any shape so long as the cross-sectional shape of the chamber and the magnet element are substantially similar and the chamber permits the free movement of the magnet element within the chamber. The preferred shape is substantially cylindrical.

In another embodiment, the front end defines an opening and the magnet element has a marking device affixed thereto. The marking device is configured to extend through the opening beyond the front end when the magnet assembly is in the second position.

In another embodiment, the device also has one or more sloping surfaces extending along the perimeter wall of the housing and spiraling forward towards the front end. The magnet element has one or more legs for engaging the at least one sloping surface, thereby causing the magnet element to rotate about a central longitudinal axis of the housing as the magnet element moves between the first position and the second position.

In a further embodiment, a method of detecting a ferromagnetic material beneath a surface is disclosed. The method includes providing a device for detecting the ferromagnetic object. The device signals the location of the ferromagnetic object by a magnet moving from a resting position linearly to an active position in response to detecting the ferromagnetic object. The method also includes the steps of placing the device against the surface and moving the device about the surface until the magnet moves from the resting position to the active position.

In another embodiment of the present invention, a locating device for ferromagnetic objects has a non-magnetic housing with a front end, a rear end, and a perimeter wall defining a chamber within the housing. A ferromagnetic member is housed within the chamber in a substantially fixed position. A magnet element is housed within the chamber between the front end and the ferromagnetic member. The magnet element is reversibly movable between a first position in which the magnet element is proximate the ferromagnetic member, and a second position in which the magnet element is proximate the front end.

In another embodiment, the locating device has a light source. Movement of the magnet element between the first position and the second position causes the light source to illuminate.

In another embodiment, the locating device also has an electrical coil housed within the chamber. The electrical coil has a magnetic environment and a light source is electrically coupled to the electrical coil. Movement of the magnet between the first position and the second position changes the magnetic environment of the electrical coil thereby inducing a current through the electrical coil capable of illuminating the light source.

In another embodiment, the magnet element in the first position is separated from the ferromagnetic element by a predefined gap.

In another embodiment, the magnet element is one of a magnet or a magnet assembly.

In another embodiment, the magnet element is a magnet assembly having a first magnet with a first diameter and a second magnet fixed to the first magnet. The second magnet has a second diameter larger than the first diameter.

In another embodiment, the magnet is a neodymium magnet.

In another embodiment, the ferromagnetic member is a metal disk.

In another embodiment, the housing is made of acrylic, polyvinyl chloride (PVC), nylon, polycarbonate, or acrylonitrile butadiene styrene (ABS) plastic.

In another embodiment, the ferromagnetic member is a steel solid, a plurality of ferromagnetic particles, a magnet, or a combination thereof.

In another embodiment, the chamber is substantially cylindrical.

In another embodiment, at least a portion of the housing is at least semi-transparent.

Another method of detecting a ferromagnetic object includes the step of providing a device for detecting the ferromagnetic object, where the device signals the location of the ferromagnetic object by a magnet moving from a first position to a second position towards the ferromagnetic object. The method also includes the steps of placing the device against the surface and moving the device about the surface until the magnet moves from the first position to the second position, thereby signaling the presence of the ferromagnetic object.

BRIEF DESCRIPTION OF THE DRAWINGS

FIG. 2 is a cross-sectional side view of lower housing of the embodiment in FIG. 1.

FIG. 3 is a perspective rear view of the lower housing in FIG. 2.

FIGS. 4A-4B illustrate perspective front and rear views, respectively, of a disk element shown in FIG. 1B.

FIG. 4C is a cross-sectional side view of the disk element in FIG. 4A.

FIG. 4D is a rear planar view of the disk element in FIG. 4B.

FIG. 5 is a cross-sectional side view of a magnet assembly of the embodiment shown in FIG. 1B.

FIG. 6A is a perspective rear view of the magnet assembly shown in FIG. 5.

FIG. 6B is a perspective front view of the magnet holder shown in FIG. 5.

FIG. 7A is a perspective front view of the upper housing shown in the embodiment in FIG. 1B.

FIG. 7B is a front view of the upper housing shown in FIG. 7A.

FIG. 7C is a cross-sectional side view of the upper housing shown in FIG. 7A.

FIGS. 17a-17e show top, top perspective, front, bottom, and bottom perspective views of an LED support of the embodiment shown in FIG. 13.

FIGS. 18a-18g show top perspective, top, side, front, side cross-sectional, bottom, and bottom perspective views, respectively, of a disk holder of the embodiment shown in FIG. 13.

DETAILED DESCRIPTION OF THE PREFERRED EMBODIMENTS

Figures 1A, 1B:
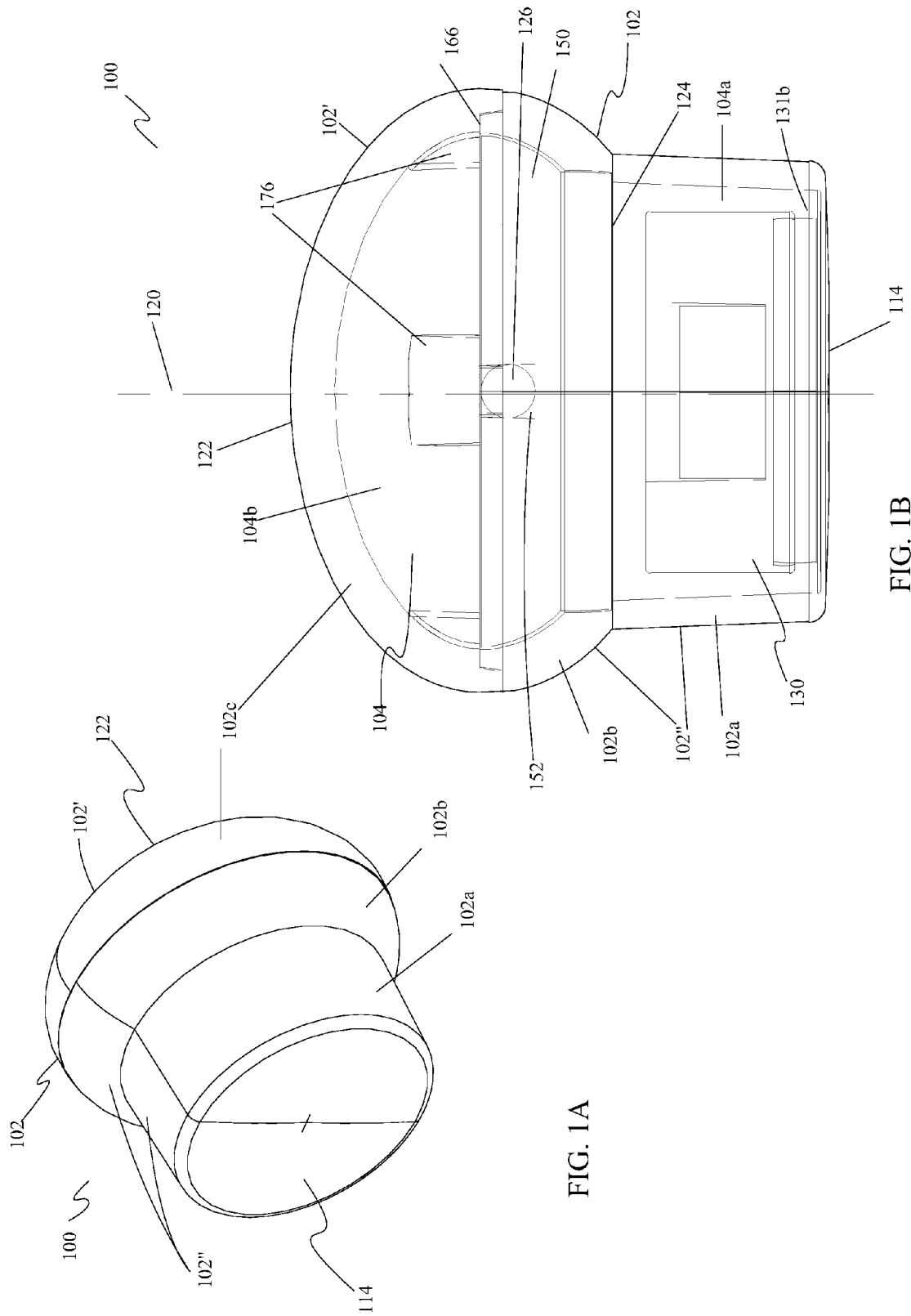
FIG. 1A is a front perspective of one embodiment of device for locating ferromagnetic objects of the present invention.
FIG. 1B is a cross-sectional view of the embodiment in FIG. 1A.

The preferred embodiments of the present invention are illustrated in FIGS. 1-23. FIG. 1A is a front perspective view of one embodiment of the present invention showing a device 100 for locating a ferromagnetic material. Device 100 includes a housing 102 having an upper housing 102', a lower housing 102", a front end 114, and a rear end or surface 122. Lower housing 102" has a cup portion 102a, a bowl portion 102b, a perimeter wall 108, and a front planar surface 116. Upper housing 102' has a dome portion 102c forming a rear cap for housing 102". Housing 102 is made of a non-magnetic material such as acrylic, acrylonitrile butadiene styrene (ABS) plastic, polyvinyl chloride (PVC), natural nylon, polycarbonate, other plastics, and non-magnetic metals. Preferably, housing 102 is made of an optically clear acrylic.

Turning now to FIG. 1B, there is illustrated a cross-sectional view of device 100 showing the various internal components of the preferred embodiment. Housing 102 defines an internal chamber 104 that includes a front portion 104a of chamber 104 and a rear portion 104b of chamber 104. Enclosed within chamber 104 of housing 102 are a magnet assembly 130, a disk element 150, and a ferromagnetic member 126. Housing 102 has a central, longitudinal axis 120 that extends perpendicular to front surface 116. A major portion 150a of disk element 150 is positioned within lower housing 102" with a minor portion 150b positioned within upper housing 102'. Disk element 150 is retained in a fixed position within housing 102 by upper housing 102' and encloses a volume within lower housing 102" that is front chamber 104a between disk element 150 and front end 114 of lower housing 102". Magnet assembly 130 is located within chamber 104a in lower housing 102" and moves between a first position 131a (not shown, but is adjacent to disk element 150) and a second position 131b (as shown in FIG. 1B) in a linear direction along central longitudinal axis 120. Ferromagnetic member 126 is securely held within an opening 152 (described below) in disk element 150. Disk element 150 has a surface (described below) that serves as a stop element 124 for magnet assembly 130 when magnet assembly 130 is in first position 131a.

Ferromagnetic member 126 may have any shape so long as its ferromagnetic properties are sufficient to be attracted by a magnet. In the preferred embodiment shown in FIG. 1B, ferromagnetic member 126 is a steel ball housed within disk element 150.

Turning now to FIGS. 2 and 3, there is illustrated cross-sectional and rear perspective views, respectively, of lower housing 102". Lower housing 102" includes cup and bowl portions 102a, 102b. Cup portion 102a preferably has a substantially cylindrical shape with a perimeter sidewall 108 and a solid front surface 116. In the embodiment shown in FIGS. 2-3, lower housing 102" has an inside wall surface 110 that has a shape similar to outside wall surface 112. It should be noted, however, that the shape of inside wall surface 110 may differ significantly from the shape of outside wall surface 112.

Bowl portion 102b has a perimeter ridge 166 and perimeter ledge 106 to engage corresponding surfaces on the dome portion (discussed later). A perimeter ledge 106 extends along the rear perimeter of bowl portion 102b. A perimeter ridge 166 extends in a rearward direction from ledge 106 and is inset towards the central axis 120 from the ledge 106. As shown in FIGS. 2-3, the perimeter ridge 166 may be a continuation of the inside wall surface 110 and may have a smaller radius than ledge 106. For ease of manufacture, perimeter sidewall 108 of cup portion 102a may taper slightly outward from central axis 120 as perimeter sidewall 108 extends rearward towards bowl portion 102b. Bowl portion 102b is preferably formed as one piece with cup section 102a creating a single, unitary lower housing 102".

Bowl portion 102b may have a modified annular shape with an arcuate sidewall 109 that flares outwardly from perimeter sidewall 108 in a rearward direction. Bowl portion 102b creates a portion of chamber 104 that accepts disk element 150. This portion of chamber 104 makes up part or all of rear chamber 104b. The flare has a rounded profile in one embodiment but it may also extend from central axis 120 at a predefined angle. In yet another embodiment, bowl portion 102b may be annular and have a straight sidewall 108. Although the preferred embodiment illustrated shows an outer diameter of bowl portion 102b as being greater than the outer diameter of cup portion 102a, it is noted that bowl portion 102b may have an outer diameter that is smaller than, equal to, or greater than the outer diameter of cup portion 102a.

Bowl portion 102b of lower housing 102" may be formed as one piece with cup portion 102a. Alternately, cup and bowl portions 102a, 102b may be separate pieces and integrally connected to each other.

FIGS. 4A-4D illustrate disk element 150. Disk element 150 is a generally flat, round, disk-shaped member with a forward surface 154, but it could have other shapes, depending on the overall design and shape of device 100. Front surface 154 of disk element 150 serves as stop element 124 that limits movement of magnet assembly 130 towards rear end 122 of device 100. In other embodiments, stop element 124 may be a protrusion, ridge, block, or other restriction on the inside wall surface 110 of housing 102 that prevents magnet assembly 130 from moving towards rear end or surface 122 of device 100 beyond a specified point.

In the embodiment illustrated in FIG. 4B, disk element 150 has an opening 152 in a rear surface 156 to accept ferromagnetic member 126. Opening 152 may be a substantially cylindrical bore extending partially into disk element 150, and have a tapered sidewall 158 that creates a restricted diameter of opening 152 at rear surface 156. A ball 126 (not shown) or other ferromagnetic object may be positioned into bore 152 and held in place by pressure from the restricted diameter 168 of opening 152, which prevents ball 126 from freely exiting from rear surface 156. In another embodiment, a plug, adhesive, or molten polymer may be used in opening 152 to retain ferromagnetic member 126. In other embodiments, ferromagnetic member 126 may be adhered to surface 156 of disk element 150. Ferromagnetic member 126 may also be contained or molded into the interior of disk element 150 or in surface 156. In another embodiment, opening 152 may extend completely through disk element 150. It is contemplated, however, that ferromagnetic member 126 may be adjacent to disk element 150 and not necessarily housed by disk element 150. The ferromagnetic member 126 may be a plurality of ferromagnetic objects or particles, or a steel ball, a magnet, or other ferromagnetic item that is magnetically attracted to a magnet.

In one embodiment, disk element 150 has a sidewall 160 with a straight section 162 and a flared section 164. Other sidewall profiles 160 may also be used. The sidewall 160 illustrated in FIG. 4C permits disk element 150 to reside within the corresponding shape of bowl portion 102b. Thus, disk element 150, and therefore the ferromagnetic member 126, is retained at a fixed distance from front end 114 of device 100.

In other embodiments, disk element 150 may simply be a flat, cylindrical disk with straight sides. In such a configuration, disk element 150 may be retained by a protrusion, fastener, reduced chamber diameter, or other stop element positioned within housing 102. Disk element 150 is preferably made from optically clear acrylic, but may also be made of acrylonitrile butadiene styrene (ABS) plastic, polyvinyl chloride (PVC), natural nylon, polycarbonate, other plastics, or other materials. It is also contemplated that ferromagnetic member 126 may be formed as disk element 150 and thereby reduce the number of components.

Straight portion 162 of disk element 150 has a preferred diameter of about 1.25 inches and height of about 0.15 inches. The diameter of rear surface 154 of the disk element 150 is about 1.5 inches. The overall thickness of disk element 150 is about 0.5 inch. Flared portion 164 may have a curved, arcuate side-view profile that increases in diameter as it extends towards rear surface 156. Flared portion 164 may also have a straight, conical profile that increases in diameter from the point at which it meets the straight portion 162 to rear surface 156. Sidewall 160 may have a side-view profile that is straight (e.g., extending generally perpendicular to the forward and rearward surfaces 154, 156), angled, curved, or a combination of various profile shapes depending on the preferred design and shape of device 100.

Magnet assembly 130 is illustrated in FIGS. 5 and 6A-B. As illustrated in this embodiment, magnet assembly 130 has a magnet holder 132 and at least one magnet 128b. Magnet holder 132 has a generally cylindrical shape and contour that corresponds to the cross-sectional contour of front chamber 104a. The contour of magnet holder 132 may have other contours, such as a rectangle, oval, trapezoid, irregular shape, etc., but should generally correspond to, or be shaped to freely move between first position 131a and second position 131b, in a predefined linear direction, within the contour of front chamber 104a. Magnet holder 132 includes a rear recess 140 and a front recess 138. A magnet 128b is affixed to, formed within, or otherwise held within rear recess 140 of magnet holder 132. Rather than occupying rear recess 140, magnet 128b could also be affixed to the surface of magnet holder 130. Magnet assembly 130 fits within front chamber 104a and is movable between first position 131a (i.e. resting position) (not shown) and second position 131b (i.e. an active position) (not shown). In resting position 131a, magnet assembly 130 is proximate to or resting against stop element 124. In active position 131b, magnet assembly 130 is proximate or against front end 114 of housing 102. In another embodiment, magnet assembly 130 may consist solely of a magnet 128b without the need for magnet holder 132.

In one embodiment, forward and rearward recesses 138, 140 contain magnets 128a, 128b, respectively. One magnet may be sufficient for operation of device 100. Nonetheless, it has been determined experimentally that a larger, thinner magnet 128a housed in forward recess 138 in combination with a smaller, thicker magnet 128b housed within rearward recess 140 is easier to manufacture and provides better control over the counteractive forces at play in the device 100. In one embodiment, larger, thinner magnet 128a protrudes from forward recess 138 beyond crown 144 of the sidewall 134. In contrast, smaller, thicker magnet 128b resides below rearward surface 136 of magnet holder 132.

In one embodiment, magnet holder 132 is about 0.4 inch in thickness from front to back, has an outer diameter of 1.1 inches, a forward recess 138 of about 1.0 inch diameter, a rearward recess 140 of about 0.5 inch diameter, and a thickness of about 0.015 inch between forward and rearward recesses 138, 140. Magnet holder 132 is preferably made of optically clear acrylic, but may also be made of acrylonitrile butadiene styrene (ABS) plastic, polyvinyl chloride (PVC), natural nylon, polycarbonate, other plastics, or other materials. Sidewall(s) 134 is preferably straight and flat with no bulging or depressions, and should be relatively smooth, with no burrs or protrusions to enable free, non-binding movement within chamber 104a.

Turning now to FIGS. 7A-7C, there is illustrated one embodiment of upper housing 102'. In this embodiment, upper housing 102' has a dome shape to provide ergonomic benefits when device 100 is handled. Upper housing 102' (i.e. cap) connects to bowl portion 102b to retain disk element 150 within bowl section 102b. In other embodiments, such as shown in FIGS. 9A-9B, for example, dome portion 102c may also be a simple cover or rear cap 102c that is formed as one piece with, or attaches to, housing 102.

As shown in FIG. 7A, upper housing 102' has an inside, dome-shaped surface 172 with one or more protrusions 176. Protrusions 176 have a block shape with a flat surface 178. Flat surface 178 on the forward end of each protrusion 176 is continuous with recessed rim 182. The plurality of protrusions 176 stabilize the position of the disk element 150. The recessed rim 182 mates with ridge 166 on disk element 150. Similarly, the front perimeter surface 180 of the upper housing 102' mates with the ledge 106 of bowl portion 102b as shown in FIGS. 2-3. It is contemplated that upper housing 102' may be a hemispherical solid with a front surface that would provide the flat surface for stabilizing the position of disk element 150.

Upper housing 102' may be permanently attached to lower housing 102' by solvent welding or melting the material along perimeter 180 and/or recessed rim 182 to fuse it with ledge 106 of bowl portion 102b. In another embodiment, the upper housing 102' may attach to bowl portion 102b or other parts of lower housing 102" by threaded engagement, fasteners, or snap fit, for example. In yet another embodiment, disk element 150 may feature threads on sidewall 160 that mate with threads on interior surface of recessed rim 182 of dome portion 102c. Similarly, all portions of housing 102 may be connected together with threaded engagement, fasteners, snap fit, solvent welding, or fusing the materials together.

Figure 8:
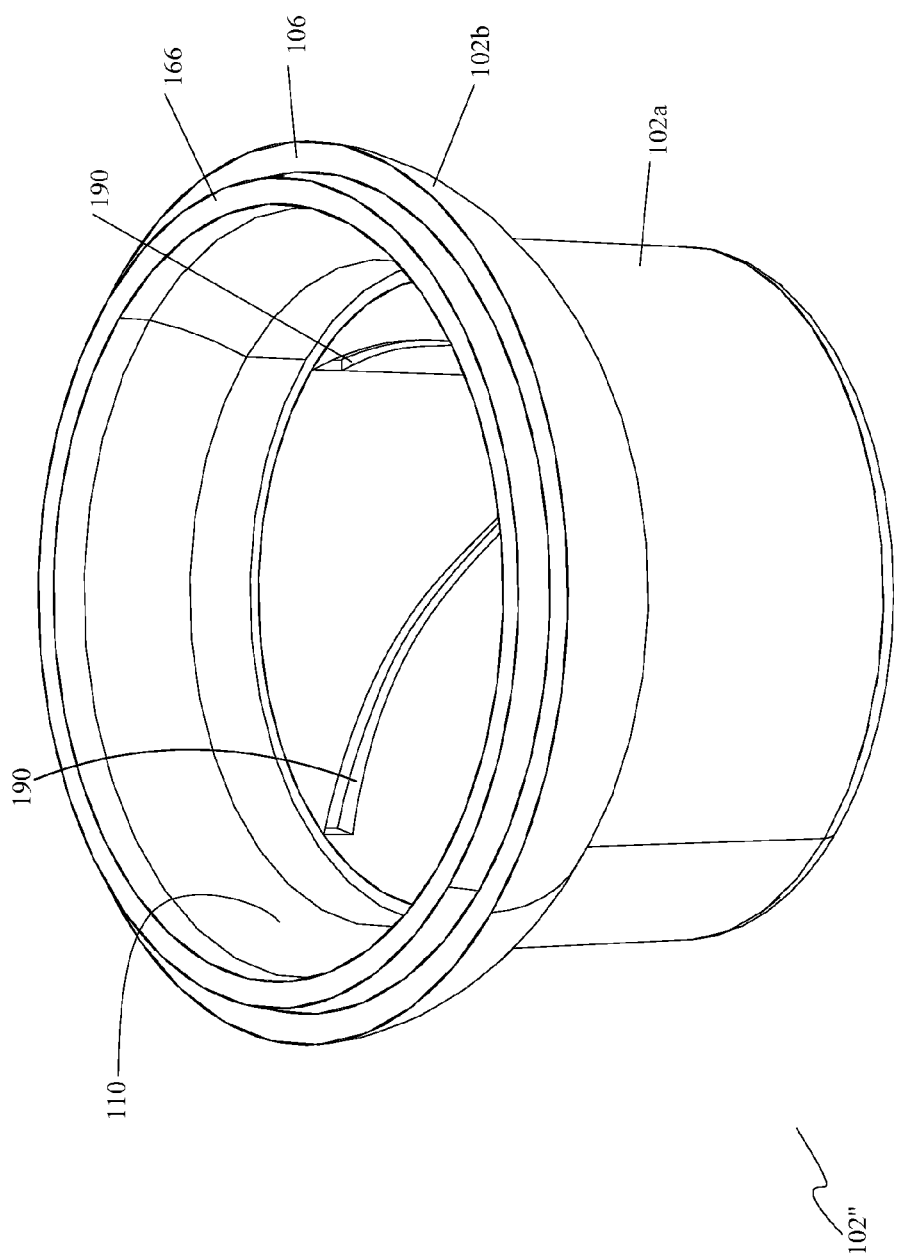
FIG. 8 is a perspective view of another embodiment of the lower housing showing sloping spiral surfaces.
Figure 9:
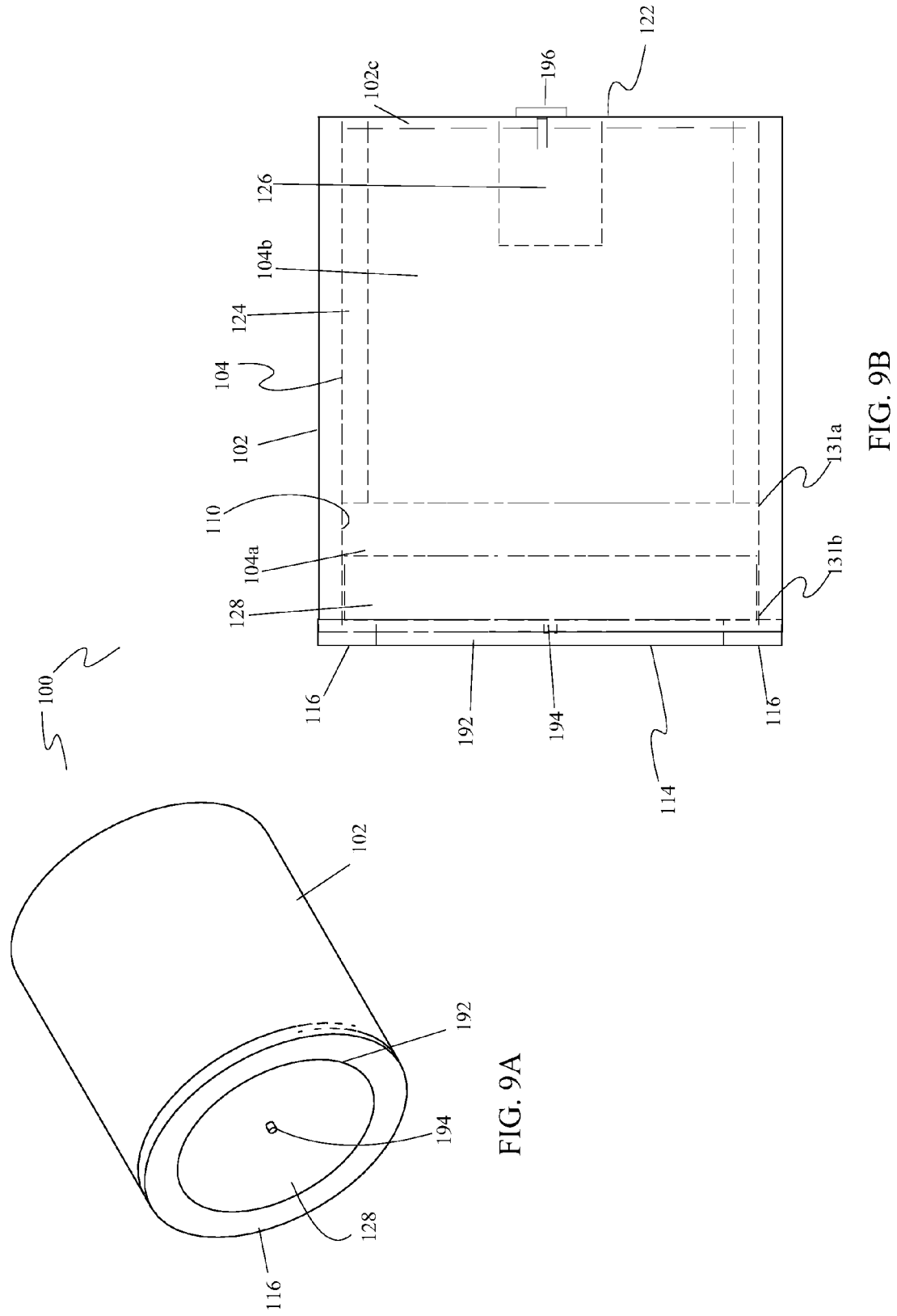
FIG. 9A is a perspective front view of another embodiment of the present invention.
FIG. 9B is a cross-sectional side view of the embodiment shown in FIG. 9A.

Referring to FIG. 8, there is illustrated an alternate embodiment of lower housing 102" that features one or more sloping surfaces 190 along the inside wall surface 110 of chamber portion 102b. Sloping surfaces 190 spiral forward towards front end 114 of device 100. Preferably, two or three spiral surfaces 190 are positioned with equal spacing around inside wall surface 110 of cup portion 102b or housing 102. Each spiral surface 190 may be a groove formed into inside wall surface 110 of housing 102. A leg 220 extending from the magnet holder 132 into the groove guides magnet assembly 132 forward or backward while rotating about the central longitudinal axis of the housing 102. Alternately, surfaces 190 each may be formed as a shelf-like ramp 190 that extends radially inward from inside wall surface 110 of housing 102, like an extended thread.

The purpose of spiral surfaces 190 is to engage a leg 220 or other feature on magnet assembly 130. When device 100 passes over a ferromagnetic object, magnet assembly 130 is rapidly attracted towards front end 114. During its movement towards front end 114, spiral or sloping surfaces 190 guide magnet assembly 130 in a rotating motion towards front end 114 of device 100.

Figure 10:
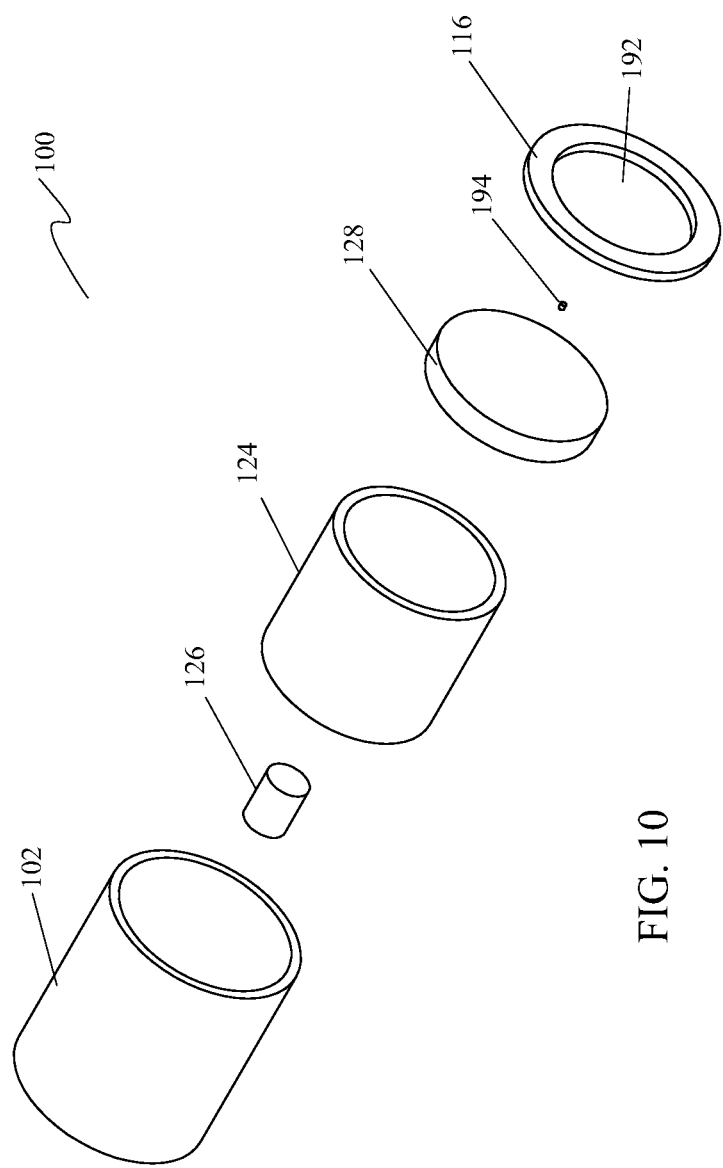
FIG. 10 is a front perspective, exploded view of the embodiment shown in FIG. 9A.

FIGS. 9A, 9B, and 10 illustrate another embodiment of device 100 of the present invention. FIGS. 9A and 9B show perspective and side views of device 100, respectively. FIG. 10 shows a perspective exploded view of the parts of one embodiment of device 100. Device 100 in the embodiment has a non-magnetic housing 102 with an interior chamber 104. Preferably, the housing 102 is a hollow cylinder with a closed end, but the housing 102 may have another shape so long as it is tubular. The device 100 has a front surface 116 and a rear surface 122 or cap 102c. Ferromagnetic member 126, such as a magnet, steel ball, or other ferromagnetic item, may be attached to the rear cap 102c or otherwise retained within rear portion 104b of chamber 104. Ferromagnetic member 126 may be attached by using an adhesive or fastener(s) 196 such as, for example, screw, bolts, rivets, and the like. Housing 102 contains a magnet element 128 in front portion 104a of chamber 104. Magnet element 128 may be a magnet or a magnet assembly 130. Stop element 124 prevents magnet element 128 from moving in the rearward direction beyond a predefined point. Stop element 124 may be one or more blocks or protrusions on or affixed to interior wall surface 110, a ridge on interior wall surface 110, a thickening of interior wall surface 110, a structure (e.g., a pin or plate) passing through housing 102 into chamber 104, or other physical structure that prevents the magnet element 128 from traveling past a predefined position within housing 102. Like front surface 154 of disk element 150 in the embodiment shown in FIG. 1, stop element 124 may be one or more structures positioned in chamber 104 that limits movement of magnet element 128 within the chamber 104.

Stop element 124 may be a structure that passes through sidewall 108 (e.g., a fastener or pin) or a structure that merely occupies a space in chamber 104 to prevent magnet element 128 from moving past stop element 124. In the embodiment shown in FIGS. 9B and 10, Stop element 124 is a hollow cylinder that fits within interior wall surface 110 of housing 102. Stop cylinder 124 has a smaller overall length from front to back than housing 102, thus defining a front portion 104a of chamber 104a (housing magnet element 128) and a rear portion 104b of chamber 104 (housing the ferromagnetic member 126 and stop cylinder 124).

As shown in FIGS. 9A, 9B, and 10, device 100 may optionally comprise a marking material or element 194 attached to magnet element assembly 130. Magnet assembly 130 may have one or more attached marking devices 194 in a location corresponding to opening(s) 192 in front surface 116. Marking device 194 marks the wall or other surface at the location of a ferromagnetic object. The marking device 194 may be, for example, pencil lead, chalk, ink, graphite, and the like.

Device 100 may automatically mark the wall or other surface. The user of device 100 can also manually mark the surface. As shown in FIGS. 9A-9B, for example, an opening 192 on front surface 116 of device housing 102 allows the marking material 194 to pass through opening 192 to scribe the wall or other surface. In combination with sloping surfaces 190 as illustrated in FIG. 8, magnet assembly 130 rotates as it moves to active position 131*b* to mark the surface. When magnet assembly 130 reaches front end 114, it does so while rotating. Because magnet assembly 130 rotates, marking device(s) 194 that extend slightly past the front surface 116 scribe the wall or other surface when magnet element 128 reaches active position 131*b* and marking device(s) 194 contact the surface.

Figure 11:
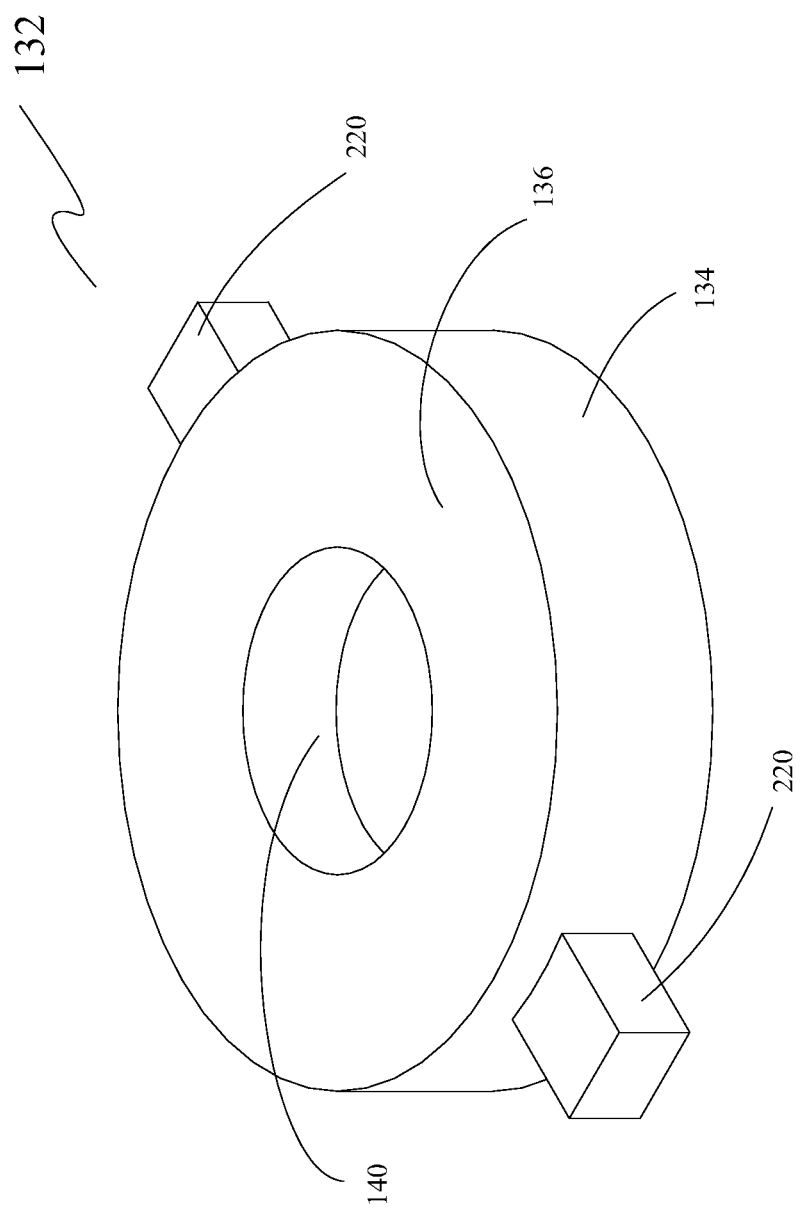
FIG. 11 is a rear perspective view of another embodiment of a magnet holder.
Figure 12:
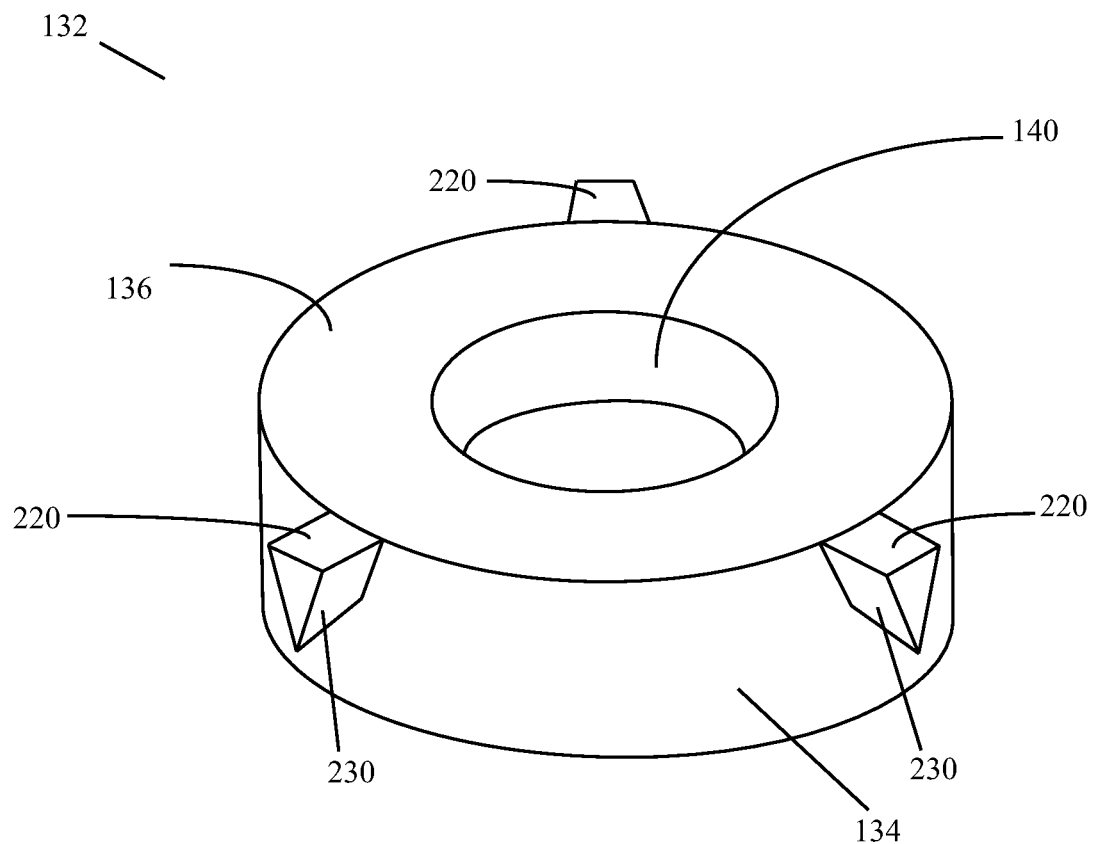
FIG. 12 is a rear perspective view of another embodiment of a magnet holder.

FIGS. 11 and 12 illustrate other embodiments of magnet holder 132. In these embodiments, magnet holder 132 preferably has two or three legs 220 protruding from sidewall 134 of holder 132. Legs 220 are equally spaced around the perimeter of magnet holder 132. In the embodiment illustrated in FIG. 11, two legs 220 are positioned on opposite sides of magnet holder 132, rotationally separated center-to-center by 180 degrees. In the embodiment illustrated in FIG. 12, three legs 220 are rotationally separated center-to-center by 120 degrees. In the embodiments illustrated in either of FIGS. 11 and 12, legs 220 extend from holder 132 to engage sloping surfaces 190 in an alternate embodiment of chamber 102 as illustrated, for example, in FIG. 8, to cause magnet holder 132 to rotate as it moves between first position 131*a* and the second position 131*b*. As illustrated in FIG. 11, legs 220 are block-shaped, but may be rounded or angled, and may have chamfered or rounded corners. FIG. 12 illustrates an example of an embodiment of magnet holder 132 with angled legs 220 in which the guiding surface 230 of leg 220 is angled appropriately to engage sloping surface 190 of housing 102. In yet another embodiment of magnet holder 132, legs 220 may engage a shelf-like ramp 190 from above and below to rotate the magnet assembly 130 as it moves between resting position 131*a* and active position 131*b*. Such engagement may be achieved, for example, by a slot formed in leg 220.

To assemble device 100 as illustrated in FIG. 1B, magnet assembly 130 is placed into cup portion 102*a* of lower housing 102". Next, disk element 150 is placed into the cavity formed by the interior of bowl portion 102*b*. Dome portion 102*c* or rear cap 102*c* is then adhered to ledge 106 and/or perimeter ridge 166 of bowl portion 102*b*, thereby holding disk element 150 in place within bowl portion 102*b* and magnet assembly 130 within cup portion 102*a*. Dome portion 102*c* is not required for device 100 to operate since ferromagnetic member 126 and/or disk element 150 could be held in place by other means.

Rear portion 104*b* of chamber 104 of device 100 houses ferromagnetic member 126 to retain magnet element 128 in resting position 131*a* when front end 114 of device 100 is not located close to a ferromagnetic object. In its quiescent or resting state, device 100 works by attracting magnet element 128 away from front of the device 114 until it contacts stop element 124. Stop element 124 is preferably a non-magnetic material positioned within the housing 102 at a fixed distance away from the front 114 of the device. Stop element 124 could also be a magnetic material, and therefore serve as the ferromagnetic member 126, or act in conjunction with the ferromagnetic member 126, provided that the magnetic attraction of magnet element 128 to stop element 124 does not defeat the magnetic attraction of magnet element 128 to a fastener or other ferromagnetic object.

Magnet element 128 is attracted to ferromagnetic member 126 with enough force to keep it in the resting position against stop element 124 while device 100 passes over a surface in search of a fastener. As soon as device 100 is moved over a fastener, steel support member, or other magnetic object, the stronger magnetic attraction to that object pulls magnet element 128 out of its resting position 131*a* to its active position 131*b*. Because the strength of the magnetic attraction increases as magnet element 128 moves closer to the fastener, magnet element 128 accelerates towards the fastener at an exponentially-increasing rate. This acceleration produces the quick snap action of magnet element 128 against the front end 114 as it is pulled towards the fastener. Regardless of how quickly device 100 is moved over a wall surface, magnet element 128 snaps out of its resting position 131*a* and moves to the active position 131*b*, thereby indicating the presence of a fastener or other ferromagnetic object. Movement of magnet element 128 to the active position 131*b* indicates the presence of a ferromagnetic object by visual, audible, and tactile cues.

The user may use device 100 to locate ferromagnetic objects by holding device 100 against a surface. Device 100 indicates the presence of a magnetic object to the user in at least three ways. When device 100 passes over a ferromagnetic object, magnet element 128 snaps against front end 114 of device 110 to indicate the location visibly, audibly or by the vibration caused by the snap action. The user may see magnet element 128 move from the resting position 131*a* to active position 131*b* by viewing its position through housing 102. The user also may receive an audible signal when magnet element 128 snaps against front end 114 of device 100. The user also may feel the vibration of magnet element 128 moving from resting position 131*a* to active position 131*b* as a result of the snap action.

Device 100 may be used on any plane because the magnetic attractive force to maintain the resting position is sufficient to overcome the force of gravity when front end 114 of device 100 faces the ground. Similarly, magnetic attraction of magnet element 128 to a fastener is sufficient to overcome both gravity and attractive forces to the ferromagnetic member 126 when device 100 faces upward.

At each fastener location a mark may be made so the user may recall the precise location of the fastener. As device 100 is used to find more fasteners, and marks are made at each location, a map of each stud or other support member will become apparent to the user. The virtue of this mapping is that even if unconventional construction techniques were used, such as non-standard spacing of structural elements or structural members that do not run the full length of a wall, the user will know the location of the structural members. This method contrasts the subjective operation of other detectors and, for example, the assumption that studs are placed sixteen inches on center.

Various embodiments of device 100 may be used to detect ferromagnetic fasteners or objects through tile, drywall, or plaster and lath, for example. The magnet(s) in device 100 may be chosen in size to facilitate detection of ferromagnetic fasteners to different depths. For example, a consumer version of device 100 may be configured for detecting ferromagnetic fasteners through ⅝" of gypsum drywall. Optionally, another version of device 100 may be configured for detection of fasteners through 1½ inches or more of drywall or other wall covering material. The size of the magnet(s) may also be tailored to target detection of fasteners of a specific minimum size.

In an alternate embodiment, the magnet element 128 is retained in its resting position with a spring 200 (not shown), ligand 202 (not shown), or pneumatic pressure. For example, a metal coil spring 200 attached between magnet element 128 and rear surface 122 of housing 102 would provide a spring force sufficient to maintain the resting position of magnet element 128 against stop element 124. In such a design spring 200 and magnet element 128 should be chosen to provide the desired offsetting forces and necessary attractive force between magnet element 128 and a fastener to achieve the ability to detect fasteners at a chosen depth within a wall. This configuration is not limited to coil springs or metal springs; other types of springs 200 and materials could be used depending on the desired physical properties.

An elastic material 202 (not shown), such as a tendon or ligand 202 may be used in place of, or in conjunction with, spring 200. Similar to the spring configuration, tendon 202 in this configuration may connect between the rear surface 122 of housing 102 and magnet element 128. Similar to spring 200, the elasticity of tendon 202 provides the force to maintain the magnet element 128 in the resting position 131a. The attraction of magnet element 128 to a fastener pulls magnet element 128 to the active position 131b and deforms tendon 202. When device 100 is moved away from the fastener, the elasticity of tendon 202 provides the force that returns tendon 202 to its original shape and returns magnet element 128 to the resting position 131a. Because a spring's force increases linearly with distance, the combination of spring 200 and magnet element 128 should be chosen so that the force of magnetic attraction to a fastener is sufficient to create rapid acceleration towards front end 114 of device 100 in spite of the spring's counter-acting force at its extended position.

In yet another alternate embodiment, device 100 may be configured as a pneumatic cylinder 204 (not shown) or piston. In this configuration, a portion of magnet element 128 forms an air-tight seal with interior wall surface 110 of housing 102. Vacuum grease may also be used to aid in forming the seal and facilitating low-friction movement of magnet element 128 within chamber 104. Depending on the materials used to construct housing 102, an O-ring (not shown) may be used around the perimeter of magnet element 128 to form a seal with the interior wall surface 110 of housing 102. In this configuration, air sealed within the rear portion 104b of chamber 104 of the housing 102 results in equilibration forces that maintain the magnet element 128 in resting position 131a until device 100 is placed over a fastener.

The pneumatic force that retains magnet element 128 in resting position 131a increases as magnet element 128 moves towards the front end 114 of device 100. The pressure inside rear portion 104b of chamber 104 decreases because the volume of the rear portion 104b increases. As a result, the dimensions of the chamber 104 should be chosen in combination with the magnet in magnet element 128 to achieve the desired acceleration of the magnet element 128 towards a ferromagnetic object.

When the magnet element 128 is located over a fastener, the magnetic attractive force overcomes the force created by the pressure differential created between the gas sealed within the rear portion 104b of housing 104 and the atmospheric pressure as the magnet element 128 moves towards the front 114 of housing 102 to its active position 131b. When magnet element 128 moves from its resting position to its active position, the volume of the air chamber 104b expands, creating a low-pressure condition within the housing 102. The pressure differential provides the force needed to return the magnet element 128 to its resting position when the device 100 is moved away from a fastener.

To set the location of the magnet element 128 in the resting position, the housing 102 may optionally feature air relief valve 206 (not shown) or re-sealable opening 207 (not shown). When valve 206 or opening 207 is open to the atmosphere, the user may position the magnet at the desired position in housing 102. The user may then close valve 206 or opening 207 to the atmosphere, thereby creating the pneumatic chamber 104b.

Figure 13:
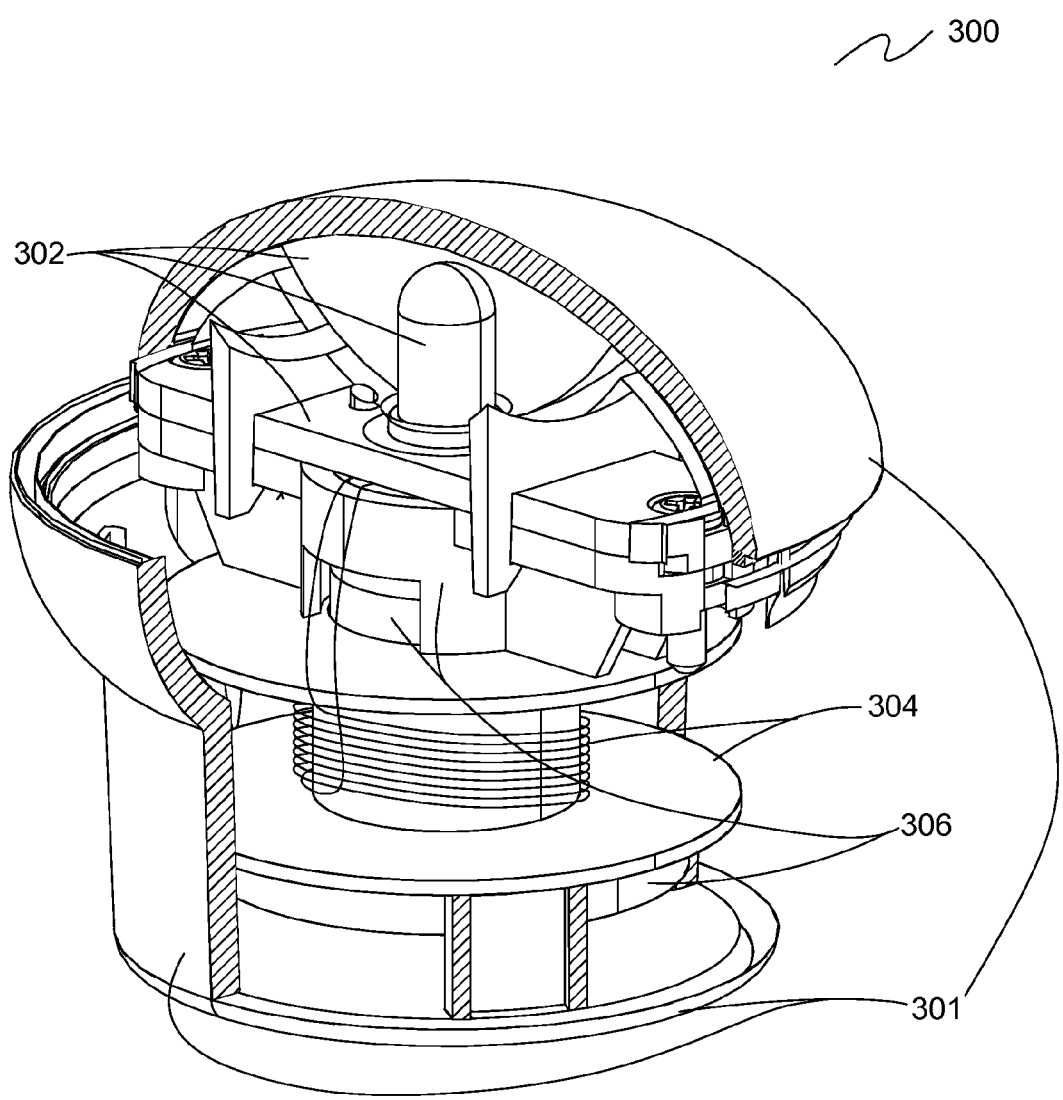
FIG. 13 is perspective partial cutaway view of an embodiment of a locating device of the present invention.

Referring now to FIG. 13, a partial cutaway view illustrates one embodiment of a locating device 300 for ferromagnetic objects. Locating device 300 has a housing assembly 301 that houses a light assembly 302, an electrical coil assembly 304, and a magnet assembly 306. Locating device 300 is similar to device 100 described above in that a magnet element moves from a first position to a second position to indicate the presence of a ferromagnetic object. Locating device 300 additionally utilizes Faraday's law of current induction to produce a current that illuminates a light source, such as a light emitting diode (LED). As a magnet moves through or relative to an electrical coil, the magnetic environment of the coil changes, thereby inducing a current through the coil.

Figure 14:
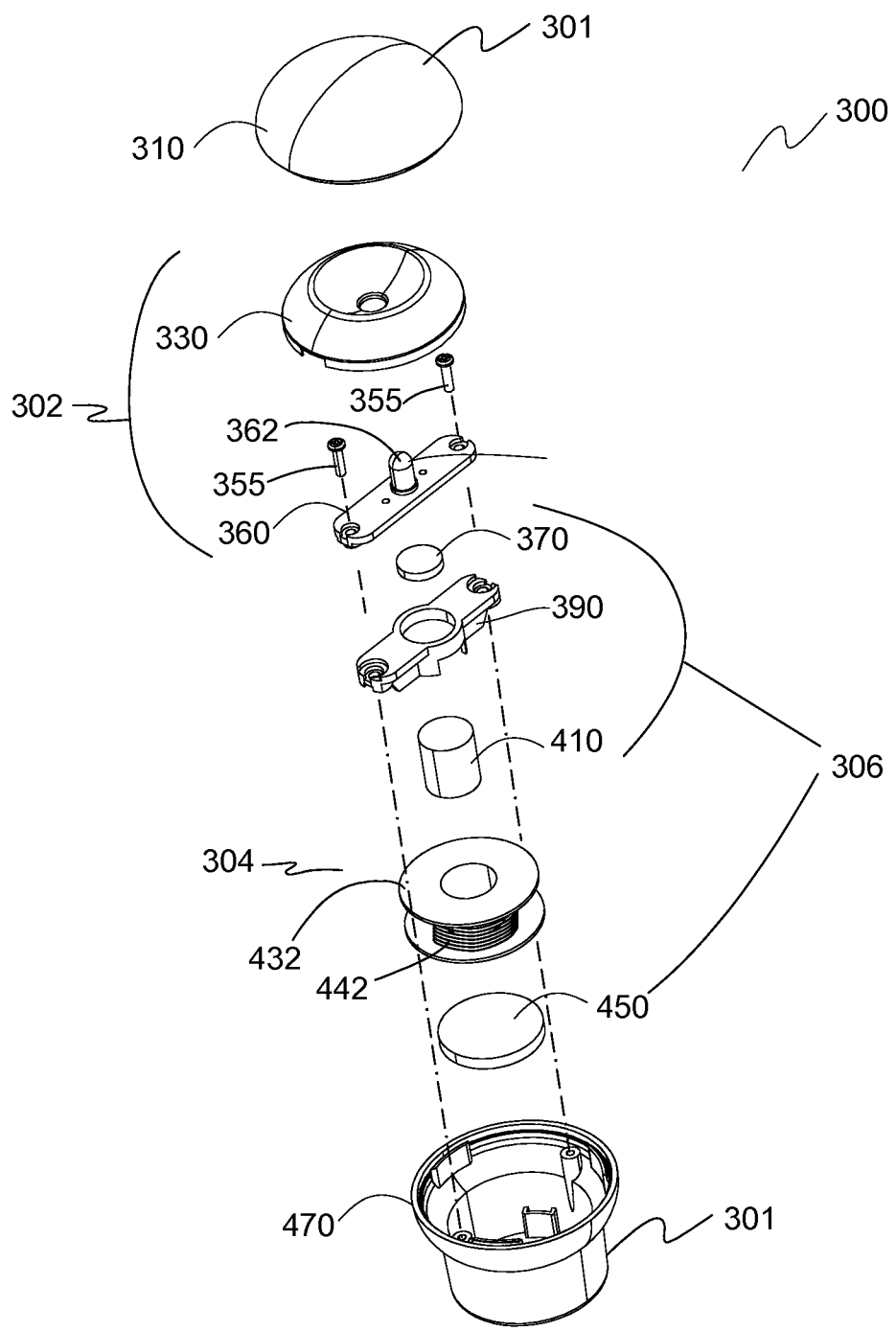
FIG. 14 is an exploded perspective view showing components of the locating device of FIG. 13.

Referring now to FIG. 14, an exploded view illustrates components of locating device 300 shown assembled in FIG. 13. Housing assembly 301 includes a housing top 310 and a housing bottom 470. Light assembly 302 includes a reflector 330, a LED support 360, a light source 362 (e.g., a light emitting diode (LED) or a lamp/bulb) and fasteners 355. Electrical coil assembly 304 includes a spool 432 with wire 442 coiled around spool 432. Electrical coil assembly 304 has a central aperture 440 through which moves a portion of magnet assembly 306. Magnet assembly 306 in one embodiment includes a disk holder 390 with a metal disk 370, a first magnet part 410, and a second magnet part 450 fixed to first magnet part 410. These components are described in more detailed below.

Figure 15A:
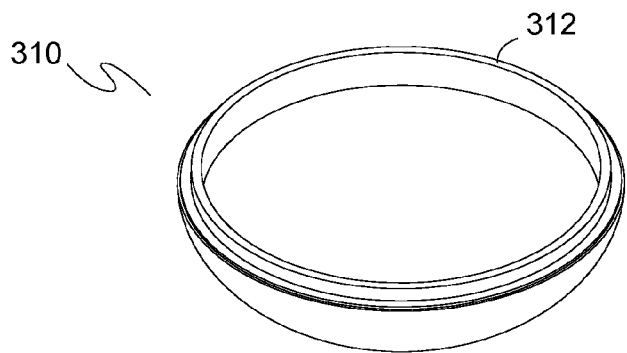
FIGS. 15a-15c show bottom perspective, front cross-sectional, and bottom views, respectively, of an upper housing of the embodiment shown in FIG. 13.
Figure 15B:
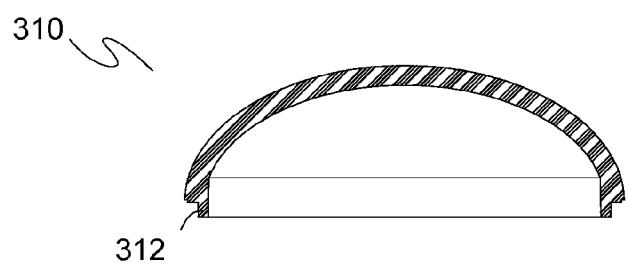
Figure 15C:
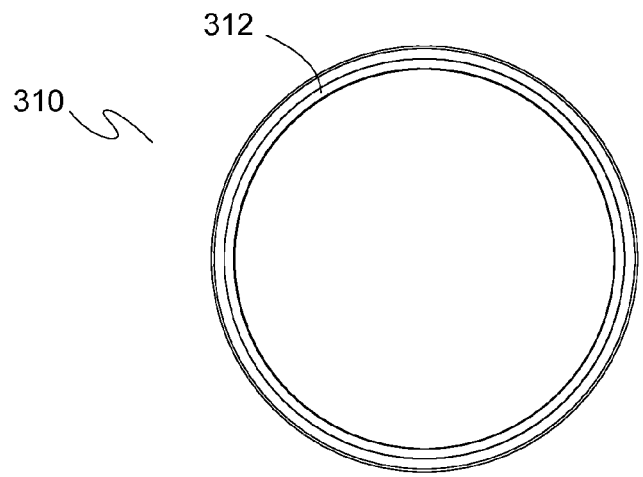
Figure 16A:
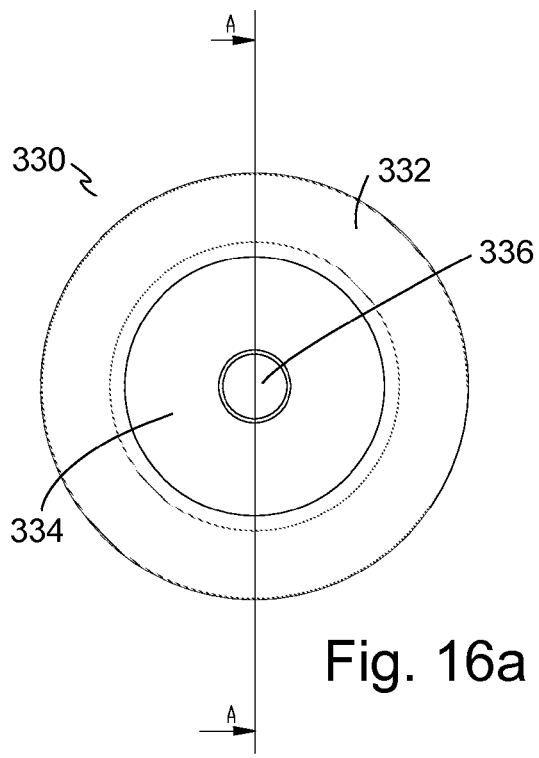
FIGS. 16a-16d show top, side cross-sectional, front and bottom perspective views, respectively, of a reflector of the embodiment shown in FIG. 13.
Figure 16B:
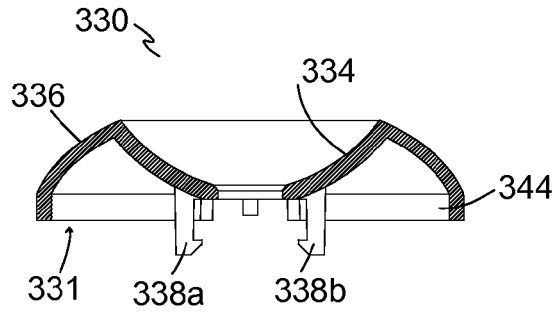
Figure 16C:
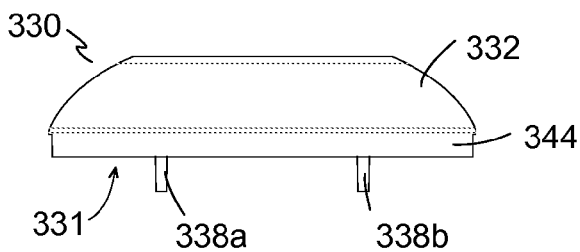
Figure 16D:
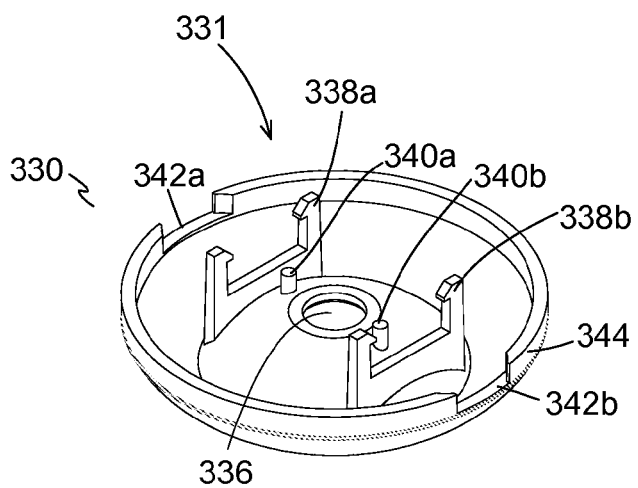

Referring now to FIGS. 15a-15c, a bottom perspective view, a side cross-sectional view, and a bottom view, respectively, show one embodiment of housing top 310. Housing top 310 preferably has a dome shape similar to upper housing 102' described above. Housing top 310 in one embodiment has a diameter of about 45 mm and preferably is made of transparent ABS plastic or polycarbonate with a thickness of about 2 mm. Housing top 310 preferably has a lip 312 that fits into housing bottom 470 and provides mating surfaces for connecting housing top 310 and housing bottom 470 using an ultrasonic weld or other method. In another embodiment, lip 312 is threaded for being screwed to housing bottom 470.

Referring now to FIGS. 16a-16d, a top view, a side sectional view cut along line A-A, a front view, and a bottom-side perspective view are shown, respectively, of one embodiment of reflector 330. Reflector 330 has a convex outer surface 332 and a concave inner surface 334 surrounding a central opening 336. Convex outer surface is shaped to fit within dome-shaped housing top 310. Central opening 336 is sized to allow light source 362 to extend through opening 336 where light emitted from light source 362 reflects off of concave inner surface 334 to be seen by a user.

A bottom side 331 of reflector 330 has clips or brackets 338a, 338b to secure LED support 360 to LED support 360 and disk holder 390, which are secured to housing bottom 470 with fasteners 355. Protrusions 340a, 340b extending from bottom side 331 of reflector 330 are sized to engage openings in LED support 360 to appropriately position light source 362 within opening 336. Notches 342a, 342b in rim 344 of reflector 330 are preferably sized to fit over or receive ends of LED support 360 and are positioned collinearly with brackets 338a, 338b, protrusions 340a, 340b, and central opening 336. Reflector 330 is preferably made of ABS plastic with a reflective surface coating.

Referring now to FIGS. 17a-17e there is shown one embodiment of LED support 360. FIGS. 17a and 17b illustrate a top view and a perspective view of LED support 360, respectively, showing top surface 363 of body 361. FIG. 17*c* shows a side view of LED support 360 with an LED 362 and bushings 372*a*, 372*b*. LED support 360 has LED contact openings 366*a*, 366*b*. In one embodiment, leads (not shown) of LED 362 make electrical contact with wire 442 of electrical coil 430 through LED contact openings 366*a*, 366*b*. Openings 368*a*, 368*b* receive protrusions 340*a*, 340*b*, respectively of reflector 330. FIGS. 17*d* and 17*e* illustrate a bottom view and a perspective view showing a bottom surface 364 of body 361 of LED support 360 and bushings 372*a*, 372*b*. Fasteners 350 (not shown) pass through fastener openings 370*a*, 370*b*, which preferably have recesses 371*a*, 371*b* to accept fastener heads. Fastener openings 370*a*, 370*b* extend through body 361 and bushings 372*a*, 372*b*, respectively of LED support 360. LED support is preferably made of ABS plastic.

Referring now to FIGS. 18*a*-18*g*, there is shown one embodiment of disk holder 390 in a perspective view (FIG. 17*a*), a top view (FIG. 18*b*), a side elevation (FIG. 18*c*), a front elevation (FIG. 18*d*), a side cross sectional view through section A-A (FIG. 18*e*), a bottom perspective view (FIG. 18*f*), and a bottom view (FIG. 18*g*). Disk holder 390 is preferably laterally symmetrical about a line of symmetry 390*a*.

As shown in FIGS. 18*a*-18*b*, disk holder 390 has a longitudinal body 391 with a top surface 392, a recess or cup 394 extending into body 391, fastener holes 396*a*, 396*b*, and fastener recesses 398*a*, 398*b*. Disk holder 390 is preferably made of ABS plastic, but may be made of other plastics or metal. Cup 394 is shaped and sized to accept ferromagnetic member 126, which is a metal disk 370 in one embodiment. Fastener holes 396 enable fasteners 355, such as screws, to extend though body 391 to engage mounting posts 484 or other mounting structure in housing bottom 470 to secure disk holder 390 to housing bottom 470. Recesses 398*a*, 398*b* accept bushings 372*a*, 372*b*, respectively, of LED support 360.

As shown in FIGS. 18*f*-18*g*, body 391 of disk holder 390 has a bottom surface 393 with flanges 400*a*-400*d* extending perpendicularly from bottom surface 393. Flanges 400*a*, 400*b* extend from a first magnet guide 402*a* towards recess 398*a*, preferably parallel to a longitudinal axis 401 extending through body 391. First magnet guide 402*a* in one embodiment is a curved flange that partially encloses a circular cup 404 and that accepts a portion of first magnet part 410. Similarly, flanges 400*c*, 400*d* extend from a second magnet guide 402*b* towards recess 398*b* parallel to longitudinal axis 401. As shown, flanges 400*a*, 400*b*, and first magnet guide 402*a* are symmetrical with flanges 400*c*, 400*d*, and second magnet guide 402*b*, respectively. In other embodiments, disk holder 390 is simply a block-like structure with cup 394 to hold metal disk 370.

Metal disk 370 is one embodiment of ferromagnetic member 126 described above with reference to device 100. Metal disk 370 is preferably made of steel with a diameter of about 10 mm and a thickness of about 2 mm. Metal disk 370 is substantially fixed at a position within housing assembly 301 and magnetically attracts and retains first and second magnet parts 410, 450 in a first position when device 300 is not located over a fastener or other ferromagnetic object with a greater magnetic force of attraction to first and second magnet parts 410, 450. That is, metal disk 370 may be securely fixed in place within housing assembly 301 or metal disk 370 may be loosely retained within a region of housing assembly 301 so long as metal disk 370 attracts first magnet part 410 or magnet assembly 130 to its first or resting position.

FIG. 18*c* is a side view of disk holder 390 showing the location of flanges 400*a*, 400*b*. FIG. 18*d* is a front elevation of disk holder 390 and showing body 391, flanges 400*a*, 400*c*, and circular cup 404. FIG. 18*e* is a side cross sectional view of disk holder 390 as viewed along section line A-A. Cup 394 is recessed into top surface 392 of body 391 with first magnet guide 402*a* extending down from bottom surface 393.

Figure 19:
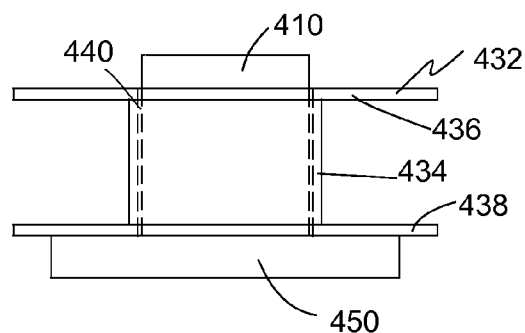
FIG. 19 illustrates a front view of an electrical coil spool and magnet assembly of the embodiment shown in FIG. 13.

Referring now to FIG. 19, a front elevation illustrates a spool 432 of electrical coil 430, first magnet part 410 and second magnet part 450. Spool 432 has a cylindrical body 434 connected between a circular top plate 436 and a circular bottom plate 438. Top plate 346 and bottom plate 348 could be other shapes, such as rectangular. Spool 432 has a central aperture 440 (also shown in FIG. 14) extending through spool 432 and sized to permit free passage of first magnet part 410. Together, first magnet part 410 and second magnet part 450 comprise one embodiment of magnet assembly 130 described above. First magnet part 412 is preferably a cylindrical magnet with a diameter of about 12 mm and a height of about 13 mm. Second magnet part is preferably a cylindrical magnet with a diameter of about 25 mm and a thickness of about 3 mm. First magnet part 410 is preferably secured to second magnet part 450 by an adhesive, forming one embodiment of magnet assembly 130. First and second magnet parts 410, 450 may also be secured to one another by magnetic attraction alone. Second magnet part 450 has a large enough diameter to prevent its passage through a central aperture 440 of spool 432. Thus, electrical coil 430 is one embodiment of stop element 124 as described above since it limits the movement of magnets assembly 130 toward metal disk 370. The relatively larger diameter, or second diameter, of second magnet part 450 improves the ability of locating device 300 to "find" ferromagnetic objects by providing a larger area of magnetic attraction as compared to a first diameter of first magnet part 410 alone.

Figure 20:
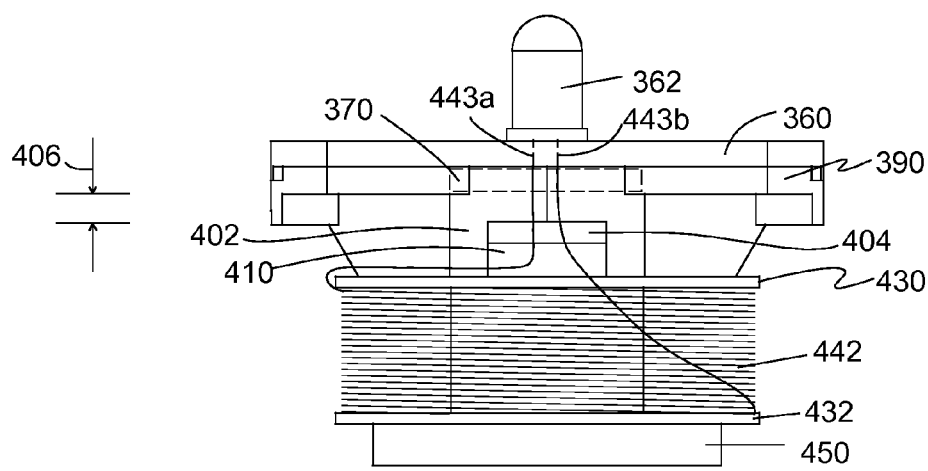
FIG. 20 illustrates a front view of a light source, LED support, disk holder, electrical coil, and magnet assembly of the embodiment shown in FIG. 13.
Figure 21:
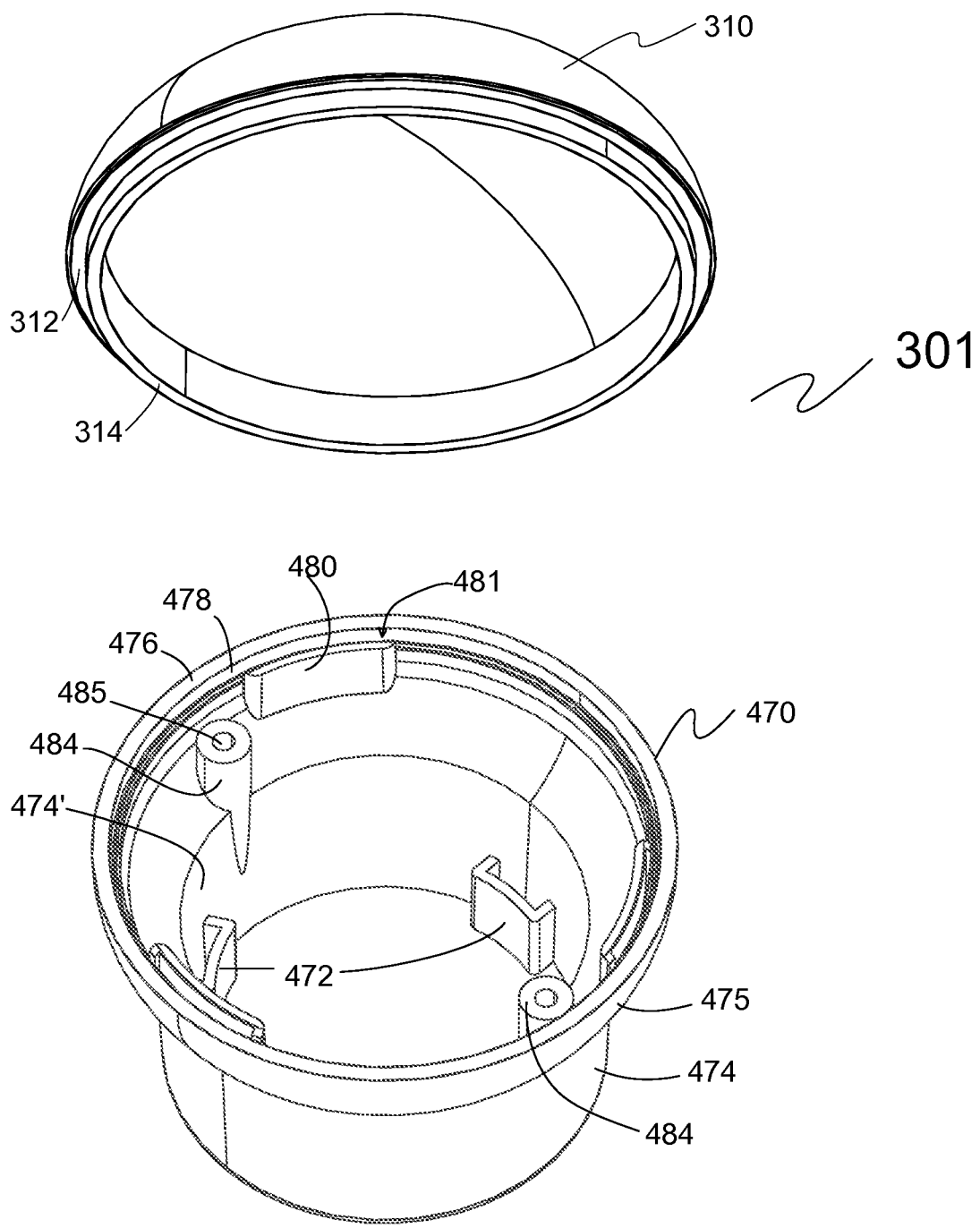
FIG. 21 illustrates perspective views of one embodiment of a housing of the embodiment shown in FIG. 13, showing a housing top and a housing bottom.

Referring now to FIG. 20, spool 432 has electrically-conductive wire 442 coiled around body 434. Preferably, electrical coil 430 has 4000-8000 turns of wire 442 around body 434. More preferably, electrical coil 430 has 8000 turns of copper wire having a thickness of about 0.7 mm. Ends 443*a*, 443*b* of wire 442 are electrically connected to light source 362.

As shown in FIGS. 19 and 20, first magnet part 410 may freely pass through central opening 440 of electrical coil 430 from a first position, where first magnet part 410 is magnetically attracted to metal disk 370 as shown in FIG. 19, and a second position (see FIG. 23*b*), where first and second magnet parts 410, 450 are attracted to a ferromagnetic fastener or other object near front end 309 of locating device 300.

In its first position, locating device 300 is preferably configured so first magnet part 410 partially enters cup 404 defined by magnet guide 402. Since first magnet part 410 is fixed to second magnet part 450, second magnet part 450 abuts spool 432 when first and second magnet part 410, 450 are in the first position. Thus, electrical coil 430 functions as stop element 124 described above by limiting the movement of first and second magnets parts 410, 450 toward metal disk 370. The placement and size of first magnet part 410, electrical coil 430, and disk holder 390 provide a pre-defined gap or distance 406 between first magnet part 410 and metal disk 370. By altering the size and/or position of various components, gap 406 may be adjusted to provide a stronger or weaker attractive force between metal disk 370 and first magnet part 410. In doing so, the detection sensitivity of locating device 300 can be tailored as desired.

In a second position (shown in FIG. 23*b*), first and second magnet part 410, 450 are attracted by a ferromagnetic object located near front end 309 of housing bottom 470. In its second position, second magnet part 450 preferably abuts front end 309 of housing bottom 470. Movement of first and second magnet parts 410, 450 relative to electrical coil 430 changes the magnetic environment of electrical coil 432, thereby inducing a current through electrical coil 430 to illuminate LED 362. Ends 443a, 443b of wire 442 are electrically coupled to LED 362 to close a circuit with electrical coil 430 and LED 362.

Figure 22A:
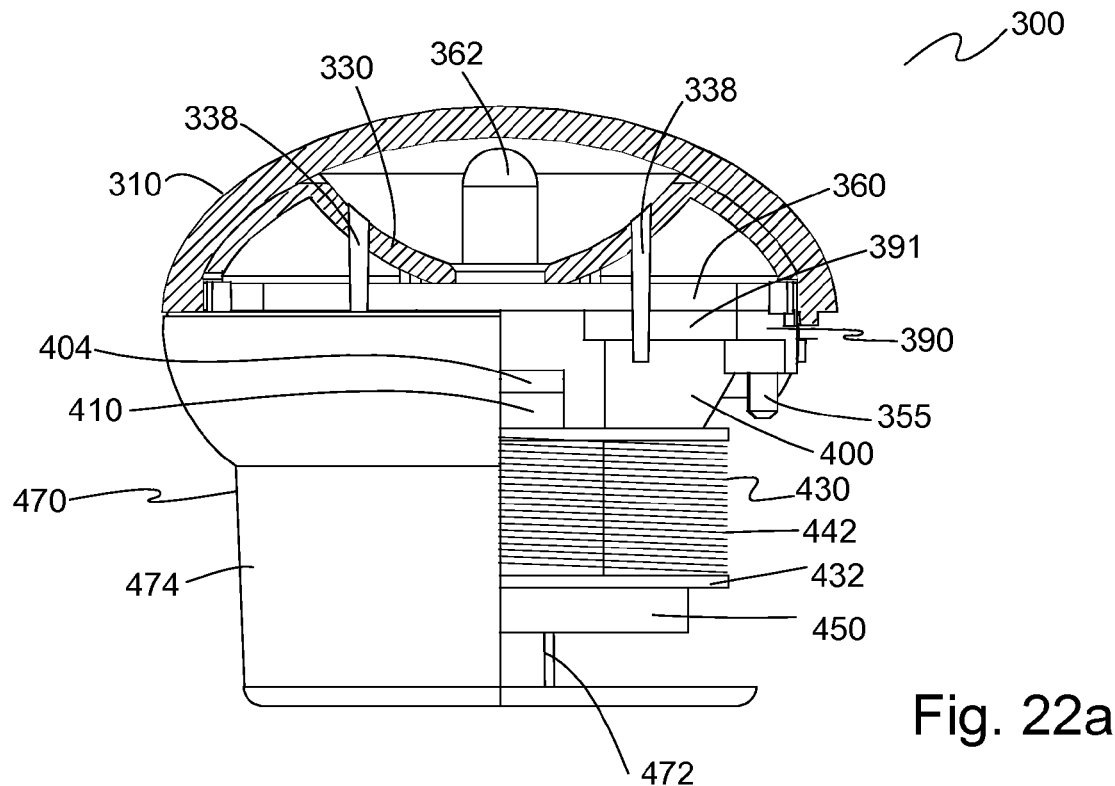
FIG. 22a illustrates a front partial double cutaway view showing the assembled components of the embodiment shown in FIG. 13 and the magnet assembly in a first position.
Figure 22B:
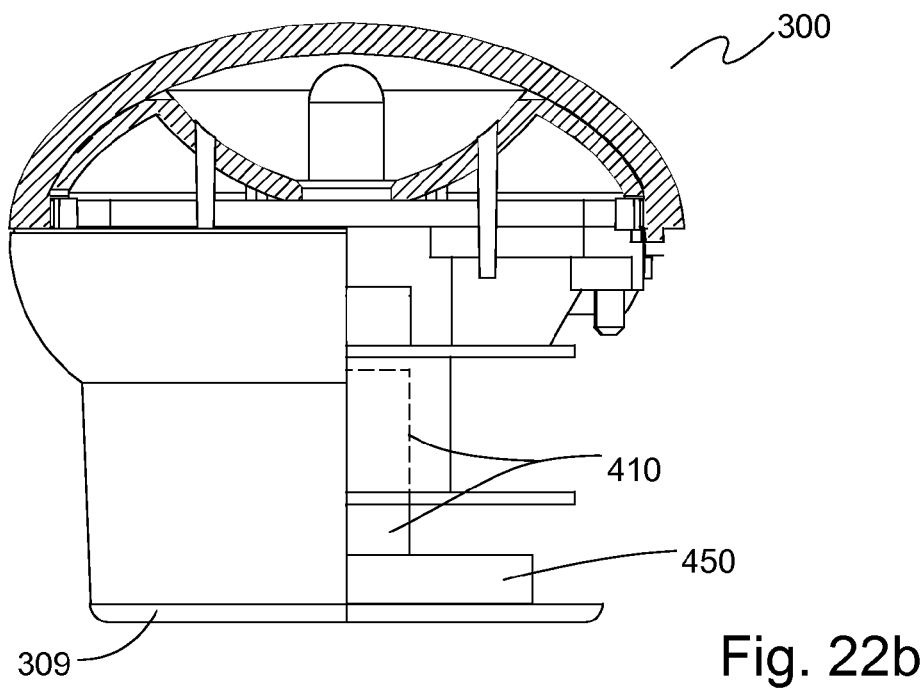
FIG. 22b illustrates a front partial double cutaway view showing the magnet assembly in a second position.
Figure 23:
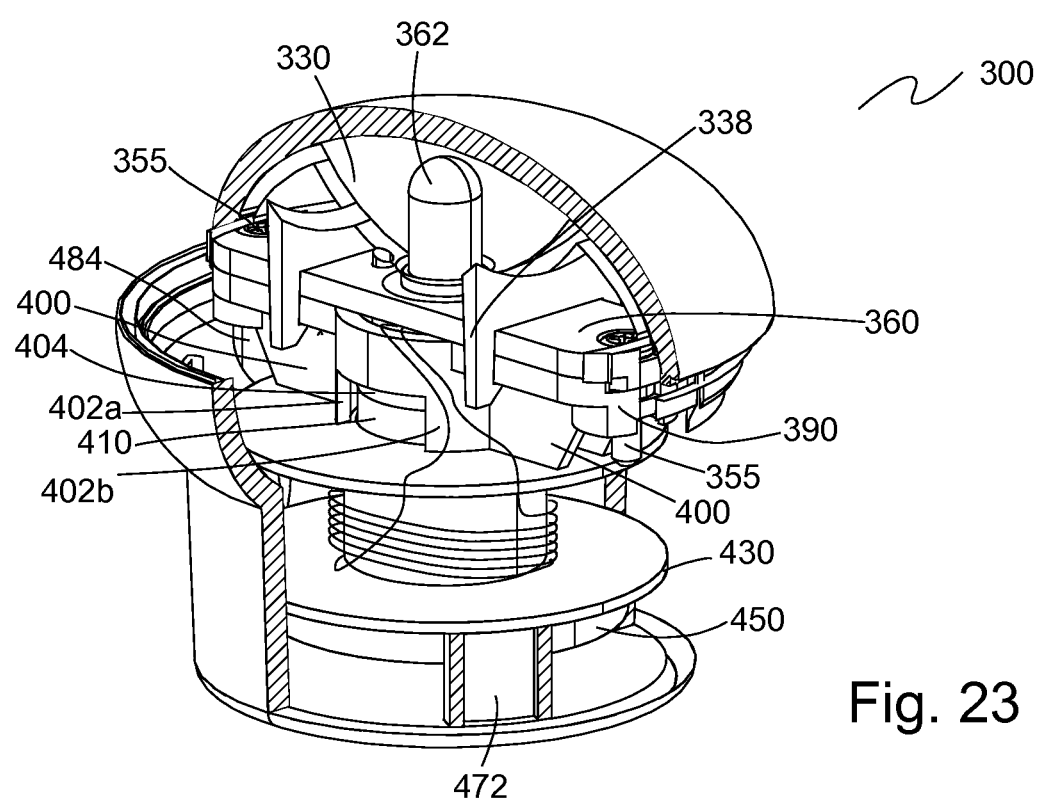
FIG. 23 illustrates a perspective partial double cutaway view showing the assembled components of the embodiment shown in FIG. 13.

Referring now to FIG. 22, a perspective view illustrates one embodiment of housing assembly 301 that includes housing top 310 and housing bottom 470. Housing assembly 301 is similar to housing 102 described above. As described above with upper housing 102c, housing top 310 has a domed or rounded shape as viewed from the front or side, and a round shape as viewed from above or below. Other shapes may also be used. Housing top 310 has an outer rim 312 and an inner rim 314, which are sized and configured to mate with housing bottom 470. Inner rim 314 of housing top 310 preferably extends below outer rim 312. Housing top is preferably made of transparent or semi-transparent ABS plastic or polycarbonate to permit light from LED to be visible by the user.

Housing bottom 470 has a round shape as viewed from above, with a lower wall 474 and an upper wall 475. Upper wall has an outer rim 476 and an inner rim 478, which are configured and sized to mate with outer rim 312 and inner rim 314, respectively, of housing top 310. Housing bottom has one or more guide blocks 480 that protrude inwardly from inner rim 478. Guide blocks 480 define a slot 481 between each guide block 480 and inner rim 478 to accept inner rim 314 of housing top 310. Housing bottom preferably has three guide blocks 480 spaced equally around inner rim 478. More or fewer guide blocks would also be acceptable as would a single, continuous guide block extending circumferentially around inner rim 478.

Housing bottom 470 has mounting posts 484 extending upwardly from lower wall 474 and upper wall 475. Each mounting post 484 has an opening 485 to receive a fastener 355 extending through LED support 360 and disk holder 370. Mounting posts 484 are positioned in alignment with fastener holes 370 of LED support 360 and with holes 396 of disk holder 390, respectively.

Housing bottom 470 also has standoffs 472 positioned within lower wall 474. In one embodiment as shown, each standoff 472 is a three-sided rectangular wall attached to or formed with an inner surface 474' of lower wall 474 by two of the three sides. Standoffs 472 serve to support electrical coil 430 and maintain its position within housing assembly 301. Standoff(s) 472 may be any shape or configuration capable of supporting electrical coil 430 and maintaining the position of electrical coil 430, such as blocks, protrusions, and the like. Housing bottom is preferably made of ABS plastic.

Referring now to FIGS. 23a-23b, front partial cutaway views illustrate one embodiment of locating device 300 as assembled. FIG. 23a shows first and second magnet parts 410, 450 are in a first position while FIG. 23b shows first and second magnet parts 410, 450 in a second position. Housing top 310 is fixed to housing bottom 470, preferably by ultrasonic welding. Reflector 330 abuts top surface 363 of LED support and fits within housing top 310. Clips 338 of reflector 330 extend down past LED support 360 and body 391 of disk holder 390. Clips 338 engage bottom surface 393 of body 391 to secure reflector 330. Housing bottom 470 has one or more standoffs 472 that protrude inwardly from lower wall 474 of housing bottom 470. Bottom plate 438 of electrical coil 430 rests on or abuts standoffs 472 and is held in place against standoffs 472 by disk holder 390 being positioned against top plate 436 of spool 432. First magnet part 410 is connected to second magnet part 450 and movable between a first position as shown in FIG. 23a and a second position towards front end 309 of locating device 300 as shown in FIG. 23b.

FIG. 24 shows a perspective partial cutaway view of locating device 300. Fasteners 355 are recessed into LED support 362 and extend through LED support 360 and disk holder 390 into mounting posts 484 (only one shown). LED support 360 with LED 362 abuts and mates with disk holder 390. Electrical coil 430 is positioned between standoffs 472 and flanges 400 of disk holder 390. As shown in its first position, first magnet part 410 is positioned partially within cup 404 defined by magnet guides 402a, 402b. First magnet part 410 is magnetically attracted to metal disk 370 (not visible).

An advantage of locating device 300 is that it locates ferromagnetic objects and illuminates a light source without the need for batteries. In other embodiments, movement of magnet assembly 130 from the first position to the second position causes light source 362 to illuminate with the aid of a battery within housing assembly 301. For example, as first and second magnet parts 410, 450 move to the second position to abut front end 309 of housing bottom 470, second magnet 470 comes to rest against electrical contacts in front end 309 of housing bottom 470, thereby completing a circuit with light source 362 and the battery. Thus, while first and second magnet parts 410, 450 remain in the second position, light source 362 remains illuminated. As another example, movement of first and second magnet parts 410, 450 to the second position triggers an on-off switch within housing assembly 301, closing a circuit with light source 362 and battery when in a second position, and opening a circuit with light source 362 and batter when in a first position.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A device for locating a ferromagnetic object, the device comprising:
- a non-magnetic housing with a front end, a rear end, and a perimeter wall defining a chamber within the housing;
- a ferromagnetic member fixedly housed within the housing;
- a magnet element movably housed within the chamber between the front end and the ferromagnetic member, wherein the magnet element is reversibly movable between a first position in which the magnet element is proximate the ferromagnetic member, and a second position in which the magnet element is proximate the front end;
- a electrical coil in the chamber and defining a central opening that surrounds at least part of the magnet element and sized for free passage of the magnet element therethrough; and
- a light source electrically coupled to the electrical coil;
- wherein the ferromagnetic member provides a magnetic attractive force sufficient by itself to return the magnet element to the first position and maintain the magnet element at the first position in the absence of the ferromagnetic object located proximate the front end; and
- wherein movement of the magnet element from the first position to the second position induces a current in the electrical coil and illuminates the light source.

2. The device of claim 1, wherein the magnet element in the first position is separated from the ferromagnetic element by a predefined gap.

3. The device of claim 1, wherein the magnet element is one of a magnet or a magnet assembly.

4. The device of claim 1, wherein the magnet element is a magnet assembly comprising:
- a first magnet with a first diameter;
- a second magnet fixed to the first magnet and having a second diameter larger than the first diameter.

5. The device of claim 1, wherein the magnet element comprises a neodymium magnet.

6. The device of claim 1, wherein the ferromagnetic member is a metal disk.

7. The device of claim 1, wherein the housing comprises a material selected from the group consisting of acrylic, polyvinyl chloride (PVC), nylon, polycarbonate, and acrylonitrile butadiene styrene (ABS) plastic.

8. The device of claim 1, wherein the ferromagnetic member is selected from the group consisting of a steel solid, a plurality of ferromagnetic particles, and combinations thereof.

9. The device of claim 1, wherein the chamber is substantially cylindrical.

10. The device of claim 1, wherein at least a portion of the housing is at least semi-transparent.

11. The device of claim 1, wherein the front end defines an opening and the magnet element further comprises a marking device affixed thereto, wherein the marking device is configured to extend through the opening beyond the front end when the magnet assembly is in the second position.

12. The device of claim 10, further comprising:
- at least one sloping surface extending along the perimeter wall of the housing and spiraling forward towards the front surface; and
- at least one leg on the magnet assembly for engaging the at least one sloping surface, thereby causing the magnet element to rotate about a central longitudinal axis of the housing as the magnet assembly moves between the first position and the second position.

13. A method of detecting a ferromagnetic object comprising:
- providing a device for detecting the ferromagnetic object, the device having a housing, a magnet housed within the housing, a wire coil defining a central opening sized and positioned for free passage of the magnet therethrough, and a light source electrically coupled to the wire coil, wherein the device signals the location of the ferromagnetic object by a magnet moving from a first position to a second position towards the ferromagnetic object, and wherein movement of the magnet from the first position to the second position induces current in the wire coil and illuminates the light source;
- placing the device against the surface; and
- moving the device about the surface until the magnet moves from the first position to the second position, thereby inducing current in the wire coil and illuminating the light source to signal the presence of the ferromagnetic object.

* * * * *